(12) United States Patent
Wang

(10) Patent No.: US 12,470,393 B2
(45) Date of Patent: Nov. 11, 2025

(54) IMAGE DATA PROCESSING METHOD AND APPARATUS, DEVICE, STORAGE MEDIUM, AND PRODUCT

(71) Applicant: Tencent Technology (Shenzhen) Company Limited, Shenzhen (CN)

(72) Inventor: Shaoming Wang, Shenzhen (CN)

(73) Assignee: Tencent Technology (Shenzhen) Company Limited (CN)

( * ) Notice: Subject to any disclaimer, the term of this patent is extended or adjusted under 35 U.S.C. 154(b) by 556 days.

(21) Appl. No.: 18/047,095

(22) Filed: Oct. 17, 2022

(65) Prior Publication Data

US 2023/0116291 A1 Apr. 13, 2023

Related U.S. Application Data

(63) Continuation of application No. PCT/CN2021/123981, filed on Oct. 15, 2021.

(30) Foreign Application Priority Data

Oct. 26, 2020 (CN) .......................... 202011160161.9

(51) Int. Cl.
*G06V 40/16* (2022.01)
*G06V 10/74* (2022.01)
(Continued)

(52) U.S. Cl.
CPC .......... *H04L 9/3231* (2013.01); *G06V 10/761* (2022.01); *G06V 40/172* (2022.01);
(Continued)

(58) Field of Classification Search
CPC ... H04L 9/3231; H04L 9/0825; H04L 9/3247; G06V 10/761; G06V 40/172;
(Continued)

(56) References Cited

U.S. PATENT DOCUMENTS

2016/0191518 A1 6/2016 Bud
2017/0091570 A1 3/2017 Rao et al.
(Continued)

FOREIGN PATENT DOCUMENTS

CN 109086669 A 12/2018
CN 109344732 A 2/2019
(Continued)

OTHER PUBLICATIONS

Office Action issued in Chinese Application No. 202011160161.9 dated Jul. 24, 2024 w/translation (20 pgs.).
(Continued)

*Primary Examiner* — Phuoc Tran
(74) *Attorney, Agent, or Firm* — Crowell & Moring LLP

(57) ABSTRACT

An image data processing method includes a first-type identity recognition performed on a target object in an image data stream. In response to the first recognition result indicating that the target object is a similar object in the similar object database, a similar identity document (ID) associated with the similar object is acquired. In addition, K pattern recognition services configured for the similar ID are also acquired. A second-type identity recognition is performed on the target object in the image data stream through the K pattern recognition services respectively to obtain K second recognition results. In response to the K second recognition results indicating that the target object is the similar object, the similar ID to the application client to cause the application client to execute an application service based on the similar ID.

20 Claims, 13 Drawing Sheets

(51) Int. Cl.
  *H04L 9/08* (2006.01)
  *H04L 9/32* (2006.01)
(52) U.S. Cl.
  CPC .......... *H04L 9/0825* (2013.01); *H04L 9/3247* (2013.01); *G06V 2201/07* (2022.01)
(58) Field of Classification Search
  CPC ............. G06V 2201/07; G06V 10/993; G06V 10/809; G06Q 20/382; G06Q 20/40145; G06F 18/22
  See application file for complete search history.

(56) References Cited

U.S. PATENT DOCUMENTS

| | | | | |
|---|---|---|---|---|
| 2018/0165781 A1* | 6/2018 | Rodriguez | ............. | H04L 63/08 |
| 2020/0042686 A1 | 2/2020 | Jiang et al. | | |
| 2021/0264135 A1* | 8/2021 | Whitelaw | ............. | G06V 10/25 |

FOREIGN PATENT DOCUMENTS

| | | |
|---|---|---|
| CN | 110008793 A | 7/2019 |
| CN | 110059560 A | 7/2019 |
| CN | 110490026 A | 11/2019 |
| CN | 111695907 A | 9/2020 |
| KR | 10-2013-0072336 A | 7/2013 |
| WO | WO 2020024398 A1 | 2/2020 |

OTHER PUBLICATIONS

Zhao, Meiming, "Application of Face Recognition Technology in Teaching Management", Journal of Higher Education, 2015, issue 7, pp. 51-52.
International Search Report and Written Opinion received for Application No. PCT/CN2021/123981 mailed Dec. 28, 2021 (English and Chinese language) (8 pages).
Extended European Search Report received in European Application No. 21884949.5 dated Sep. 22, 2023 (10 pgs.).
Supplementary European Search Report received in European Application No. 21884949.5 dated Oct. 10, 2023 (1 pg.).
Abobeah et al., "Public-Key Cryptography Techniques Evaluation," *International Journal of Computer Networks and Applications*, 2(2):64-75 (2015).
Dixit and Shirdhonkar, "Face-based Document Image Retrieval System," *Procedia Computer Science*, 132:659-668 (2018).
Galbally and Marcel, "Face Anti-Spoofing Based on General Image Quality Assessment," $22^{nd}$ *International Conference on Pattern Recognition*, pp. 1173-178 (2014).
Fang et al., "ID Card Identification System based on Image Recognition," $12^{th}$ *IEEE Conference on Industrial Electronics and Applications (ICIEA)*, pp. 1488-1492 (2017).

* cited by examiner

IMAGE DATA PROCESSING METHOD AND APPARATUS, DEVICE, STORAGE MEDIUM, AND PRODUCT

RELATED APPLICATION

This application claims priority to PCT Application No. PCT/CN2021/123981, filed on Oct. 15, 2021, entitled "IMAGE DATA PROCESSING METHOD AND APPARATUS, DEVICE, STORAGE MEDIUM, AND PRODUCT," which claims priority to Chinese Patent Application No. 202011160161.9, entitled IMAGE DATA PROCESSING METHOD AND APPARATUS, DEVICE, STORAGE MEDIUM, AND PRODUCT and filed on Oct. 26, 2020, which is incorporated herein by reference in their entireties.

FIELD OF THE TECHNOLOGY

This application relates to the field of computer technologies, and in particular, to an image data processing method and apparatus, a computer device, a computer-readable storage medium, and a computer program product.

BACKGROUND OF THE DISCLOSURE

A user (e.g., a user A), after accessing an application client (e.g., an application client C with a payment function), may collect image data associated with the user A through the application client running in a user terminal, and then directly upload the image data to a backend for identity recognition. This means that when the backend recognizes that the user A belongs to a legitimate object (e.g., a non-highly similar group), the application client C is allowed to execute a service (e.g., a payment service) associated with the user A.

In an object recognition manner in the related art, when the backend recognizes that the user A belongs to an illegitimate object (e.g., a highly similar group such as a group of twins), it is difficult to identify real identity information of the user A in the highly similar group. As a result, an identity recognition failure result may be directly returned to the application client, object recognition accuracy is low, and it is difficult for the user to execute the foregoing payment service in this round.

SUMMARY

Embodiments of this application provide an image data processing method and apparatus, a computer device, a computer-readable storage medium, and a computer program product, which can improve accuracy of object recognition and ensure reliability of service execution.

An embodiment of this application provides an image data processing method, performed by a computer device, the method including:
acquiring an image data stream including a target object and collected by an application client, and performing first-type identity recognition on the target object in the image data stream based on a similar object database to obtain a first recognition result;
acquiring, in response to the first recognition result indicating that the target object is a similar object in the similar object database, a similar identity document (ID) associated with the similar object, and acquiring, from a similar service configuration library associated with the similar object database, K pattern recognition services configured for the similar ID; K being a positive integer;
performing second-type identity recognition on the target object in the image data stream through the K pattern recognition services respectively to obtain K second recognition results; and
outputting, in response to the K second recognition results indicating that the target object is the similar object, the similar ID to the application client to cause the application client to execute an application service based on the similar ID.

An embodiment of this application further provides an image data processing apparatus, including:
a data stream acquisition module configured to acquire an image data stream including a target object and collected by an application client, and perform first-type identity recognition on the target object in the image data stream based on a similar object database to obtain a first recognition result;
a similar identity acquisition module configured to acquire, in response to the first recognition result indicating that the target object is a similar object in the similar object database, a similar ID associated with the similar object, and acquire, from a similar service configuration library associated with the similar object database, K pattern recognition services configured for the similar ID; K being a positive integer;
a pattern recognition service module configured to perform second-type identity recognition on the target object in the image data stream through the K pattern recognition services respectively to obtain K second recognition results; and
a similar identity output module configured to output, in response to the K second recognition results indicating that the target object is the similar object, the similar ID to the application client to cause the application client to execute an application service based on the similar ID.

An embodiment of this application further provides an image data processing method, performed by a computer device, the method including:
outputting, in response to a trigger operation for an application display interface of an application client, an image collection interface of the application client;
collecting an image data stream including a target object through the image collection interface, and uploading the image data stream to a service server to cause the service server to perform first-type identity recognition on the target object in the image data stream based on a similar object database to obtain a first recognition result; the first recognition result being used for instructing the service server to acquire, from a similar service configuration library associated with the similar object database, K pattern recognition services for performing second-type identity recognition on the target object in response to the target object being a similar object in the similar object database; and
receiving a similar ID of the target object returned by the service server based on the K pattern recognition services, and executing an application service of the application client based on the similar ID.

An embodiment of this application further provides an image data processing apparatus, including:
a collection interface output module configured to output, in response to a trigger operation for an application display interface of an application client, an image collection interface of the application client;

a data stream upload module configured to collect an image data stream including a target object through the image collection interface, and upload the image data stream to a service server to cause the service server to perform first-type identity recognition on the target object in the image data stream based on a similar object database to obtain a first recognition result; the first recognition result being used for instructing the service server to acquire, from a similar service configuration library associated with the similar object database, K pattern recognition services for performing second-type identity recognition on the target object in response to the target object being a similar object in the similar object database; and a similar identity receiving module configured to receive a similar ID of the target object returned by the service server based on the K pattern recognition services, and execute an application service of the application client based on the similar ID.

An embodiment of this application further provides a computing device, including a processor and a memory, the processor being connected to the memory, the memory being configured to store a computer program; and the processor being configured to invoke the computer program to perform the image data processing method according to the embodiments of this application.

An embodiment of this application further provides a computer-readable storage medium, the computer-readable storage medium storing a computer program, the computer program including program instructions, the program instructions, when executed by a processor, performing the image data processing method according to the embodiments of this application.

An embodiment of this application further provides a computer program product or a computer program. The computer program product or the computer program includes computer instructions, and the computer instructions are stored in a computer-readable storage medium. A processor of a computer device reads the computer instructions from the computer-readable storage medium, and executes the computer instructions, to cause the computer device to perform the image data processing method according to the embodiments of this application.

The computer device in this embodiment of this application, when acquiring an image data stream including a target object and collected by an application client, may perform first-type identity recognition on the target object in the image data stream based on a similar object database to obtain a first recognition result. If the first recognition result indicates that the target object is a similar object in the similar object database, the computer device may acquire a similar ID associated with the similar object, and acquire, from a similar service configuration library associated with the similar object database, K pattern recognition services configured for the similar ID. K may be a positive integer. The computer device performs second-type identity recognition on the target object in the image data stream through the K pattern recognition services respectively to obtain K second recognition results. If the K second recognition results indicate that the target object is the similar object, the computer device may output the similar ID to the application client to cause the application client to execute an application service based on the similar ID. As can be seen, in this embodiment of this application, the computer device, when recognizing that an object corresponding to the target object belongs to a similar user group, may perform identity recognition again on the target object in the image data stream collected by the application client through another pattern recognition service (i.e., the foregoing K pattern recognition services). Therefore, user identity of the target object can be determined when target objects recognized by the K pattern recognition services are all consistent with the similar object recognized by the above face recognition, and the similar ID (i.e., identification information for uniquely identifying user identity of a user to which the target object belongs) acquired by the foregoing similar object can be returned to the application client to ensure accuracy of object recognition, thereby ensuring reliability of service execution.

DESCRIPTION OF EMBODIMENTS

Figure 1:
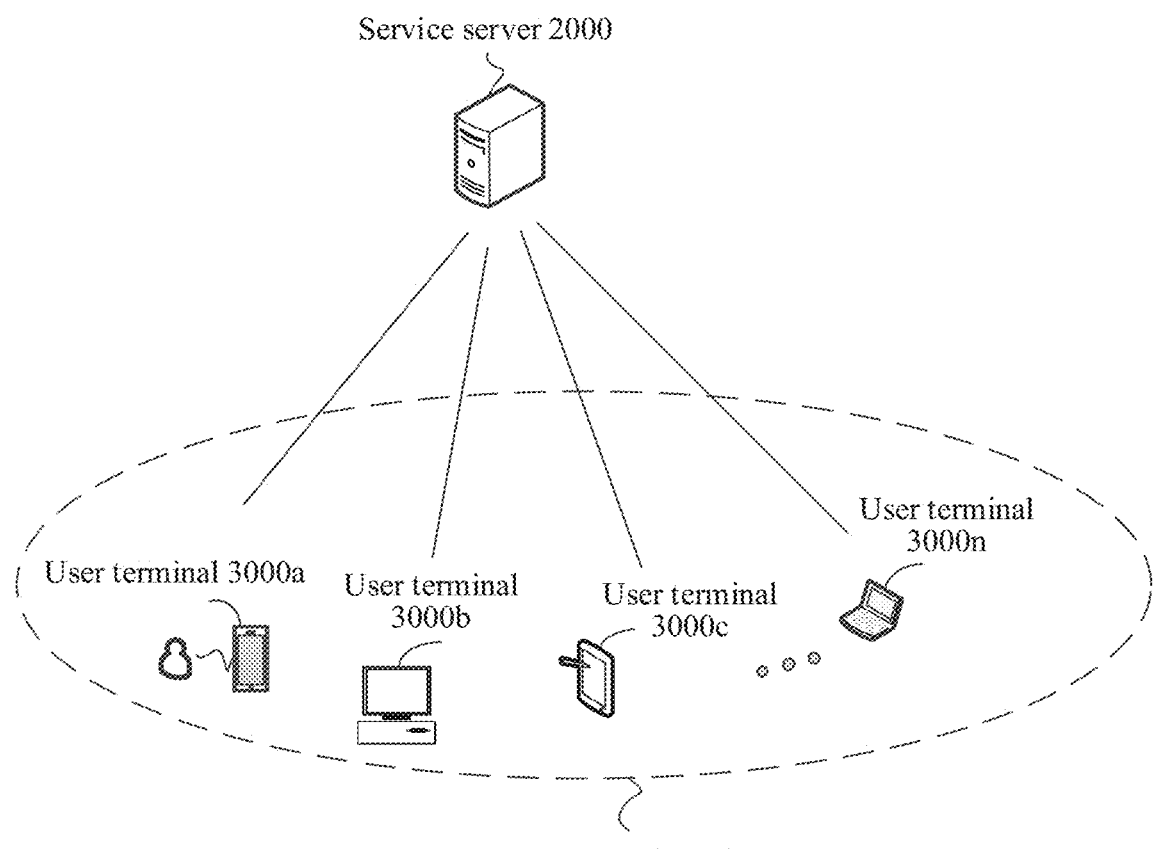
FIG. 1 is a schematic structural diagram of a network architecture according to an embodiment of this application.

The technical solutions in the embodiments of this application are clearly described in the following with reference to the accompanying drawings in the embodiments of this application. Apparently, the described embodiments are merely some embodiments of this application rather than all of the embodiments. All other embodiments obtained by a person of ordinary skill in the art based on the embodiments of this application without making creative efforts shall fall within the protection scope of this application.

In the following descriptions, related "some embodiments" describe a subset of all possible embodiments. However, it may be understood that the "some embodiments" may be the same subset or different subsets of all the possible embodiments, and may be combined with each other without conflict.

In the following description, the involved term "first/second" is merely intended to distinguish similar objects but does not necessarily indicate a specific order of an object. It may be understood that "first/second" is interchangeable in terms of a specific order or sequence if permitted, so that the embodiments of this application described herein can be implemented in a sequence in addition to the sequence shown or described herein.

Artificial Intelligence (AI) is a theory, method, technology and application system that uses a digital computer or a machine controlled by the digital computer to simulate, extend, and expand human intelligence, perceive the environment, acquire knowledge, and use knowledge to obtain the best result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

An AI technology is a comprehensive discipline, covering a wide range of fields including both a hardware-level technology and a software-level technology. The basic AI technology generally includes a technology such as a sensor, a dedicated AI chip, cloud computing, distributed storage, a big data processing technology, an operation/interaction system, or mechatronics. An AI software technology mainly includes fields such as a computer vision (CV) technology, a speech processing technology, a natural language processing technology, and machine learning/deep learning.

The solution provided in the embodiments of this application belong to the CV technology in the field of AI. It is to be understood that, the CV technology is a science that studies how to use a machine to "see", namely, uses a camera and a computer to replace human eyes to perform machine vision such as recognition, tracking, and measurement on an object, and perform graphic processing, so that the computer processes the object into an image more suitable for human eyes to observe, or an image transmitted to an instrument for detection. As a scientific subject, the CV studies related theories and technologies, and attempts to establish an AI system that can obtain information from images or multidimensional data. The CV technologies usually include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, or map construction, and further include biological feature recognition technologies such as common face recognition and fingerprint recognition.

Referring to FIG. 1, FIG. 1 is a schematic structural diagram of a network architecture according to an embodiment of this application. As shown in FIG. 1, the network architecture may include a user terminal cluster and a service server 2000. It may be understood that the user terminal cluster herein may include one or more user terminals. The quantity of the user terminals in the user terminal cluster may vary in different embodiments. As shown in FIG. 1, the user terminal cluster may include a plurality of user terminals, which may include, for example, a user terminal 3000a, a user terminal 3000b, a user terminal 3000c, . . . , and a user terminal 3000n shown in FIG. 1. As shown in FIG. 1, the user terminal 3000a, the user terminal 3000b, the user terminal 3000c, . . . , and the user terminal 3000n may each establish a network connection to the service server 2000, so that each user terminal in the user terminal cluster can perform data exchange with the service server 2000 through the network connection. For example, in an object recognition scenario, each user terminal in the user terminal cluster may be configured to acquire an image data stream including a target object. The object recognition scenario herein may include a face recognition scenario, an animal recognition scenario, and the like. The object recognition scenario may not be enumerated herein.

For ease of understanding, in this embodiment of this application, one user terminal may be selected from the plurality of user terminals shown in FIG. 1 as a target user terminal. For example, the user terminal 3000a shown in FIG. 1 may be used as the target user terminal to describe a process of data exchange between the target user terminal and the service server 2000. It may be understood that the target user terminal herein may include: smart terminals with an image collection function such as smart phones, tablet computers, laptop computers, desktop computers, and smart TVs. It may be understood that one or more application clients may run in the target user terminal. When one application client (e.g., a client A) in the application clients runs in the target user terminal, a camera (the camera herein may include a front camera and a rear camera) in the target user terminal may be invoked through the client A to collect images to take one or more pieces of collected image data as the image data stream including the target object.

It is to be understood that, in this embodiment of this application, one or more pieces of image data collected by the target user terminal may be collectively referred to as an image frame. The quantity of the image frames collected may vary in different embodiments. The application clients may include clients with an image data collection function such as a social client, a payment client, an access control client, a multimedia client (e.g., a video client), an entertainment client (e.g., a game client), an education client, an autopilot client, and an office client.

The service server 2000 shown in FIG. 1 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform, which are merely example embodiments.

For ease of understanding, in this embodiment of this application, a process of identity authentication on the target object in the image data stream in the social client is described with an example in which the application client currently running in the target user terminal is the above social client. It may be understood that, when the object recognition scenario is the face recognition scenario, the target object herein may include a face of a user, and the identity authentication herein means that the target user terminal needs to accurately and reliably acquire an ID of the user (e.g., a user ID) before executing the corresponding application service (e.g., a payment service), so as to ensure reliability of service execution. When the object recognition scenario is the animal recognition scenario, the target object herein may include a body of an animal (e.g., head and body parts of the animal), and the identity authentication herein means that the target user terminal needs to accurately and reliably acquire an ID of the animal (e.g., an animal ID) before executing the corresponding application service (e.g., a stray animal supervision service), so as to ensure reliability of service execution.

Figure 2:
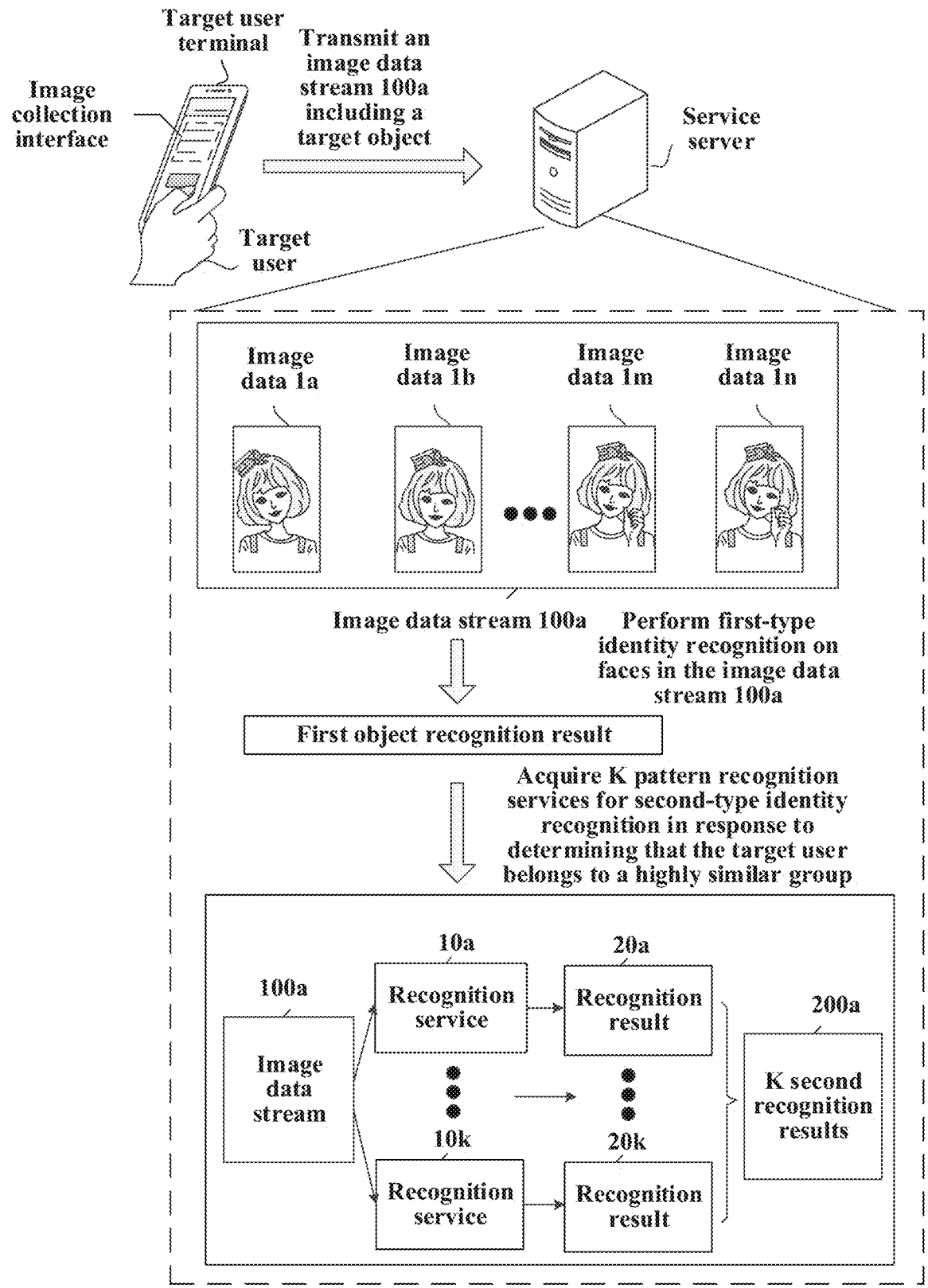
FIG. 2 is a schematic diagram of a scenario of data exchange according to an embodiment of this application.

In some embodiments, a process of recognizing the ID of the user is described herein with an example in which the object recognition scenario is the face recognition scenario. Referring to FIG. 2, FIG. 2 is a schematic diagram of a scenario of data exchange according to an embodiment of this application. The target user terminal as shown in FIG. 2 may be the user terminal 3000a shown in FIG. 1. The target user terminal as shown in FIG. 2 may display, on an application display interface (for example, the application display interface may be an image collection interface) corresponding to the application client, one or more pieces of image data associated with a target user shown in FIG. 2 and collected by a camera in the target user terminal, and determine the one or more pieces of image data collected as the image data stream including the target object. The target object herein may be a face of the target user shown in FIG. 2.

For ease of understanding, in this embodiment of this application, for example, the application client herein is the social client, and the image collection interface shown in FIG. 2 can be displayed on the target user terminal when the target user shown in FIG. 2 needs to execute a face scanning service (e.g., a face-scanning payment service) through the social client. In this embodiment, the target user terminal may invoke a camera associated with the application client. It may be understood that the invoked camera associated with the application client may be a front camera in the object recognition scenario (e.g., the foregoing face recognition scenario) corresponding to the face scanning service. In this way, when the target user terminal acquires the one or more pieces of image data (the image data herein may be facial image data) associated with the target user, such image data may be outputted and displayed on the image collection interface.

It may be understood that, as shown in FIG. 2, the target user terminal may collectively include each piece of image data (e.g., each piece of face image data) obtained by the above front camera shooting the face of the target user as an image frame in some embodiments. In this embodiment, the target user terminal may obtain an image data stream 100a including the target object (i.e., the face of the target user) shown in FIG. 2 according to such facial image data including the face of the target user. As shown in FIG. 2, the image data stream 100a acquired by the service server may include a plurality of image frames. The plurality of image frames may include image data 1a, image data 1b, . . . , image data 1m, and image data 1n shown in FIG. 2.

As shown in FIG. 2, when the target user terminal transmits the image data stream 100a shown in FIG. 2 to the service server shown in FIG. 2, the service server may perform first-type identity recognition on the target object in the image data stream based on a constructed similar object database (i.e., a similar object database of objects with high similarities) to obtain a first recognition result. It may be understood that the service server herein may be the service server 2000 in the foregoing embodiment corresponding to FIG. 1.

It may be understood that the objects with high similarities herein mean that a similarity between an object (e.g., the target user shown in FIG. 2, such as a user A) and another object (e.g., a user B) reaches a similarity threshold. In this embodiment, in this embodiment of this application, the target user (such as the user A) may be classified into a similar user group. In this embodiment of this application, the similar user group herein may be collectively referred to as a first-type user. Based on the above, in this embodiment of this application, a service database corresponding to the similar user group (i.e., the first-type user) to which the user A belongs may be collectively referred to as a first-type database. When the above object recognition scenario is the face recognition scenario, the first-type database in which the user A is located may also be collectively referred to as a similar object database.

In some embodiments, in this embodiment of this application, a similarity between the target user (e.g., a user C) and another user (e.g., the user B) does not reach the similarity threshold, the user C is classified into a non-similar user group (i.e., it may be determined that the user C belongs to a second-type user). In addition, to facilitate distinction from the above similar object database, in this embodiment of this application, a service database corresponding to the non-similar user group (i.e., the second-type user) to which the user C belongs may be collectively referred to as a second-type database. When the above object recognition scenario is the face recognition scenario, the first-type database in which the user A is located may be collectively referred to as a normal object database.

In some embodiments, as shown in FIG. 2, the service server, when recognizing according to a first object recognition result that the target user shown in FIG. 2 belongs to the similar user group, may distribute the image data stream 100a shown in FIG. 2 to K pattern recognition services shown in FIG. 2 to perform multiple identity authentication on the target object (i.e., the face of the target user) in the image data stream 100a through the K pattern recognition services, so as to improve accuracy of object recognition. K may be a positive integer. As shown in FIG. 2, the K pattern recognition services herein may include a recognition service 10a, . . . , and a recognition service 10k shown in FIG. 2. It may be understood that, in the pattern recognition services, the recognition service 10a is different from other recognition services (for example, different from the recognition service 10k). Based on this, K second recognition results shown in FIG. 2 can be obtained when the service server performs second-type identity recognition on the target object in the image data stream 100a based on the pattern recognition services. Based on the above, when the K second recognition results indicate that the face of the target user (i.e., the target object) shown in FIG. 2 is a similar object in the foregoing similar object database, the service server may return a similar ID (e.g., a user ID1) corresponding to the similar object to the target user terminal shown in FIG. 2, so that the application client (e.g., the social client such as a WeChat client) running in the target user terminal can execute the application service (e.g., the payment service) based on the received similar ID.

As can be seen, to ensure accuracy of object recognition and reliability of service execution, in this embodiment of this application, when it is recognized that the target user shown in FIG. 2 belongs to the similar user group (i.e., a highly similar group), the image data stream 100a shown in FIG. 2 can be distributed to another recognition service so as to confirm the user identity of the target user through the another recognition service. This means that, in this embodiment of this application, multiple identity authentication can be performed on the face of the target user through multiple parallel pattern recognition services, and then it can be determined that the face scanning service is completed once when the multiple identity authentication is successful.

An embodiment in which the service server shown in FIG. 2 acquires the image data stream and performs multiple identity authentication on the target object in the image data stream through the K pattern recognition services may be obtained with reference to the description in the following embodiments corresponding to FIG. 3 to FIG. 10.

Figure 3:
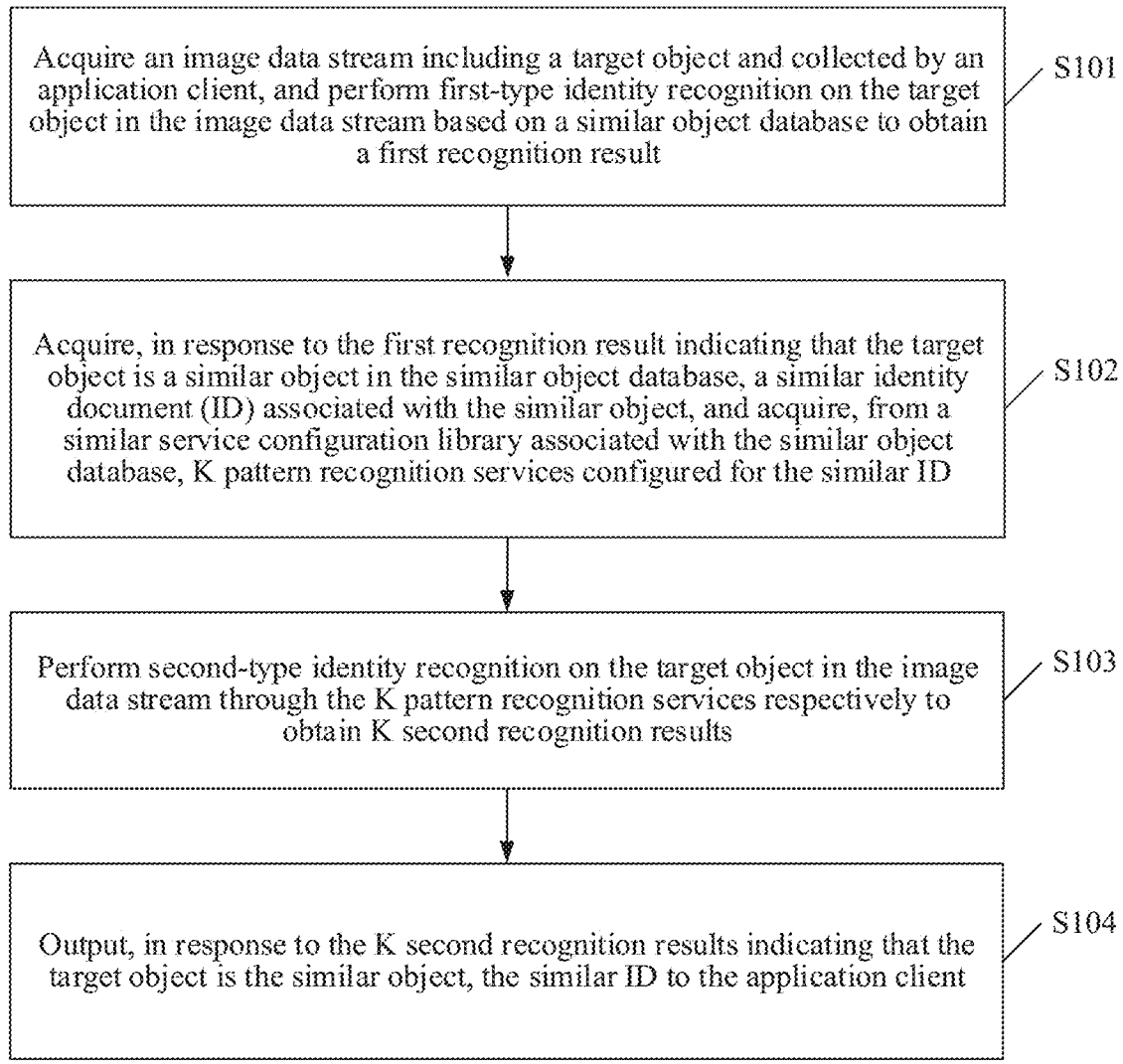
FIG. 3 is a schematic flowchart of an image data processing method according to an embodiment of this application.

In some embodiments, referring to FIG. 3, FIG. 3 is a schematic flowchart of an image data processing method according to an embodiment of this application. It may be understood that the method according to this embodiment of this application may be performed by a computer device. The computer device includes a user terminal or a service server in one embodiment. For ease of understanding, in this embodiment of this application, a process of performing, by a service server, identity authentication on the target object in the acquired image data stream is described with an example in which the computer device is the service server. The service server herein may be the service server in the foregoing embodiment corresponding to FIG. 2. As shown in FIG. 3, the method may include at least the following step S101 to step S104:

Step S101: Acquire an image data stream including a target object and collected by an application client, and perform first-type identity recognition on the target object in the image data stream based on a similar object database to obtain a first recognition result.

In some embodiments, the user terminal (the target user terminal as shown in FIG. 2) is provided with an application client. In practical application, the user terminal runs the application client for image collection, generates a service data packet based on a collected image data stream including a target object, and transmits the service data packet to the service server. The service server acquires the service data packet uploaded by the application client, and may parse the service data packet through a streaming media service associated with the application client to obtain application signature information corresponding to the application client and the image data stream including the target object. The application signature information may be obtained after the application client signs the collected image data stream through an application private key. In some embodiments, the service server may perform signature verification on the application signature information through an application public key corresponding to the application private key. In some embodiments, the service server may determine, in response to the signature verification being successful, the application client transmitting the image data stream to be a legitimate client, so as to determine that the image data stream belongs to a legitimate data stream associated with an associated application service of the application client. In some embodiments, the service server may acquire a target image frame including a target object from the legitimate data stream, and perform first-type identity recognition on the target object in the target image frame based on the similar object database to obtain the first recognition result.

Herein, the target object may be different types of objects such as users or animals. When the target object is a target user, in a process of collecting, by the target user, image data including the target object through the target user terminal, the target user terminal may determine, based on different attributes of objects (e.g., the users or animals) currently presented on an image collection interface of the application client, service scenarios to which the corresponding objects belong. For example, the service scenarios herein may include the face recognition scenario, the animal recognition scenario, and the like. The face recognition scenario may be a service scenario corresponding to the above face scanning service. Similarly, the animal recognition scenario may be a service scenario corresponding to the above stray animal supervision service.

It is to be understood that, in this embodiment of this application, when the front camera associated with the application client is enabled, the target user terminal may invoke the front camera to collect the image data stream associated with the target user. The image data stream herein may include at least one piece of image data associated with the target user. It may be understood that the target user terminal may perform object detection on the target object in the collected image data through the application client during the collection of the image data. If it is detected that the target object herein is a user, the target user terminal may determine that a service type corresponding to the application client may belong to a first service scenario. The first service scenario may be the above face recognition scenario. In some embodiments, if it is detected that the target object herein is a non-user (e.g., an animal), the target user terminal may determine that the service type corresponding to the application client may belong to a second service scenario. The second service scenario may be the above animal recognition scenario.

For ease of understanding, for example, the service scenario is the first service scenario (i.e., the above face recognition scenario), and in the first service scenario (i.e., the face recognition scenario), the application client running in the target user terminal may include some clients with face recognition services, such as a screen-lock client for face-based terminal unlocking, a client for face-based application login, a remote client for face-based remote verification, an access control client for face-based access control unlocking, a payment client for face-based offline payment, an attendance client for face-based attendance checking, and a pass client for face-based automatic face scanning.

In practical application, the target user terminal, when collecting the image data stream including the target object (i.e., the face of the target user) through the application client (e.g., the payment client), may sign the collected image data stream through the application private key of the application client to obtain the application signature information for the image data stream. In some embodiments, the target user terminal may encapsulate the application signature information and the image data stream to obtain a service data packet corresponding to the application client. In this embodiment, the target user terminal may upload the service data packet carrying the application signature information to the computer device (i.e., the above service server), so that the service server can perform signature verification on the application signature information carried in the service data packet according to an application public key of the application client to ensure reliability of data sources.

Figure 4:
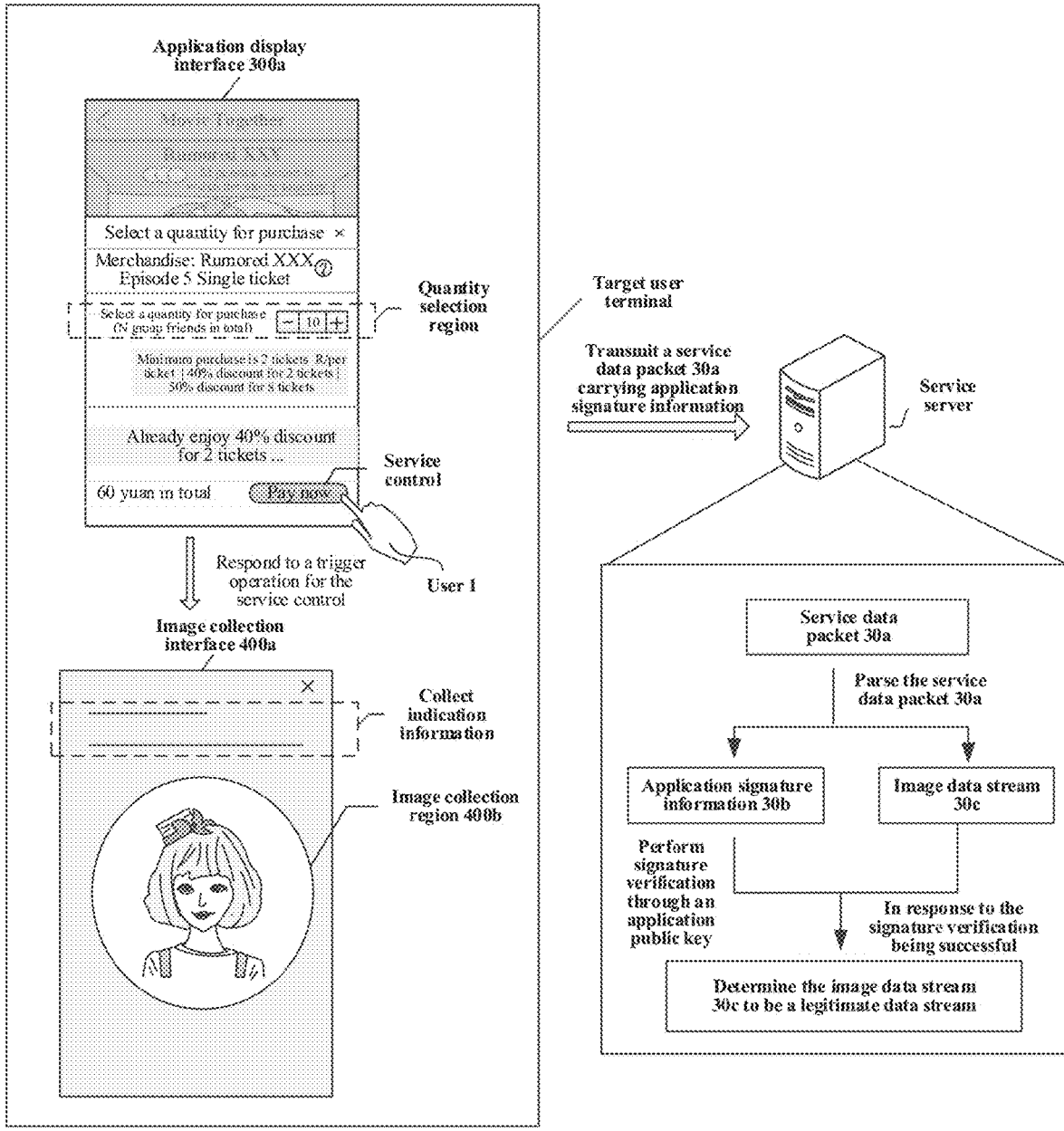
FIG. 4 is a schematic diagram of a scenario of acquiring an image data stream according to an embodiment of this application.

For ease of understanding, in some embodiments, referring to FIG. 4, FIG. 4 is a schematic diagram of a scenario of acquiring an image data stream according to an embodiment of this application. An application display interface 300a shown in FIG. 4 is an application display interface of the above application client (e.g., the payment client; as shown in FIG. 4, the payment client may be a video client). As shown in FIG. 4, the application display interface may include a quantity selection region for an item (e.g., a movie ticket). A user 1 as shown in FIG. 4 may be the above target user. The target user (i.e., the user 1), when selecting a required quantity of items in the quantity selection region in the application display interface 300*a* shown in FIG. 4, may click a service control (i.e., a "Pay now" control) shown in FIG. 4. In this embodiment, the target user terminal shown in FIG. 4 may respond to a trigger operation for the service control in the application display interface of the application client to output an image collection interface 400*a* shown in FIG. 4. As shown in FIG. 4, the image collection interface 400*a* may include collection indication information for instructing the user 1 to perform image collection. This means that the user 1 shown in FIG. 4 may perform a corresponding action based on the collection indication information to collect one or more pieces of image data including a face of the user 1 (which mainly refers to face image data of the user 1 currently collected). In this embodiment of this application, the image data including the face of the user 1 may be used as an image data stream to be uploaded to a service server shown in FIG. 4.

In some embodiments, to ensure legitimacy of the image data stream acquired by the service server, the target user terminal in this embodiment of this application may transmit the application signature information for the image data stream to the service server shown in FIG. 4 while transmitting the image data stream to the service server.

In some embodiments, the target user terminal may also pre-encapsulate the image data stream and the application signature information to transmit a service data packet obtained by encapsulation (i.e., a service data packet 30*a* carrying the application signature information shown in FIG. 4) to the service server shown in FIG. 4. In this way, when the service server shown in FIG. 4 acquires the service data packet 30*a* uploaded by the target user terminal, the service data packet 30*a* may be parsed through a streaming media service associated with the application client (e.g., the foregoing video client) to obtain application signature information 30*b* corresponding to the application client and an image data stream 30*c* including the target object (i.e., the face of the user 1 shown in FIG. 4). It may be understood that the application signature information 30*b* herein may be obtained after the application client signs the collected image data stream 30*c* through a locally stored application private key.

It may be understood that a core function of the streaming media service is to verify the image data stream 30*c* from the target user terminal. In addition, when it is determined that the user 1 belongs to the similar user group (i.e., the above first-type user), the streaming media service herein may also distribute the image data stream 30*c* to other recognition services so as to provide K parallel pattern (e.g., at least two patterns) recognition services in the service server. In addition, the streaming media service herein may be further used for receiving recognition results obtained by the K pattern recognition services, and then return the obtained recognition results to the target user terminal shown in FIG. 4.

For example, the service server shown in FIG. 4 may perform, through the application public key of the application client, signature verification on the application signature information obtained by parsing, and then determine that a data source of the image data stream 30*c* is legitimate when the signature verification is successful. Therefore, the image data stream 30*c* shown in FIG. 4 can be determined to be a legitimate data stream. In some embodiments, the service server may acquire a target image frame including a target object from the legitimate data stream, so as to perform first-type identity recognition on the target object in the target image frame based on the similar object database to obtain the first recognition result.

Figure 5:
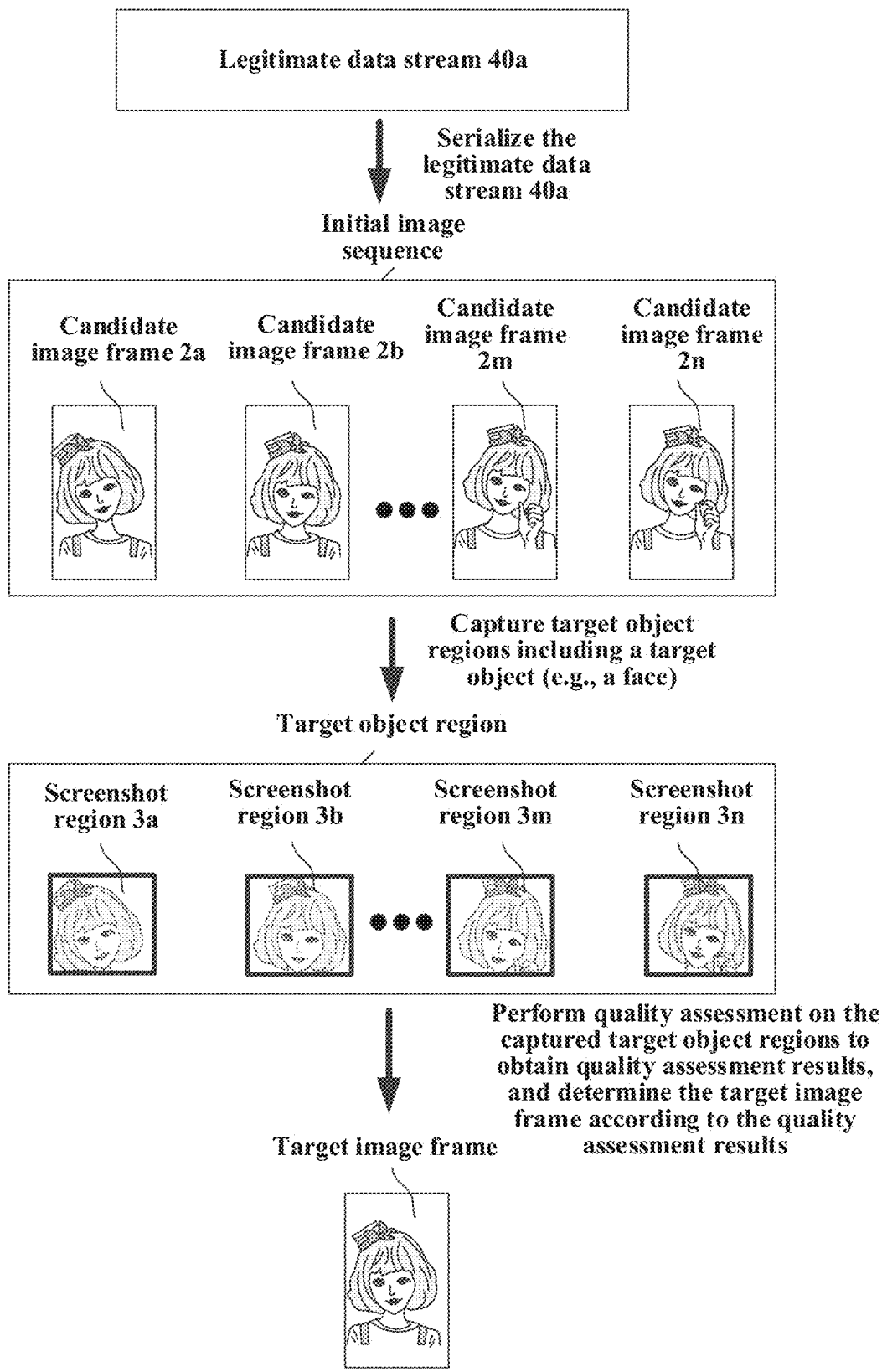
FIG. 5 is a schematic diagram of a scenario of selecting a target image frame from a legitimate data stream according to an embodiment of this application.

For ease of understanding, in some embodiments, referring to FIG. 5, FIG. 5 is a schematic diagram of a scenario of selecting a target image frame from a legitimate data stream according to an embodiment of this application. It may be understood that a legitimate data stream 40*a* herein may be the image data stream 100*a* in the foregoing embodiment corresponding to FIG. 2. That is, the image frame in the legitimate data stream 40*a* may include the image frame in the foregoing embodiment corresponding to FIG. 2. It may be understood that, as shown in FIG. 5, in this embodiment of this application, the legitimate data stream 40*a* may be serialized to obtain an initial image sequence corresponding to the legitimate data stream 40*a*.

In some embodiments, the service server may take each image frame of the initial image sequence as a candidate image frame. As shown in FIG. 5, each candidate image frame in the initial image sequence may include a candidate image frame 2*a*, a candidate image frame 2*b*, . . . , a candidate image frame 2*m*, and a candidate image frame 2*n* shown in FIG. 5. During the image collection, to enable in vivo detection on the target user, in general, the target user may be required to perform a corresponding action (e.g., blink, open mouth, a specific gesture, or the like) according to certain collection indication information. Therefore, some image frames with poor image quality may exist in the legitimate data stream (e.g., the legitimate data stream 40*a* in this embodiment corresponding to FIG. 5) acquired by the service server (i.e., some blurred image frames exist). Based on this, in this embodiment of this application, after the image frames in the legitimate data stream are taken as candidate image frames, screenshot regions including the target object (i.e., the face of the target user) can be captured from the candidate image frames as target object regions.

For example, as shown in FIG. 5, in this embodiment of this application, a screenshot region 3*a* including the face may be captured from the candidate image frame 2*a*, a screenshot region 3*b* including the face may be captured from the candidate image frame 2*b*, . . . , a screenshot region 3*m* including the face may be captured from the candidate image frame 2*m*, and a screenshot region 3*n* including the face may be captured from the candidate image frame 2*n*. In some embodiments, as shown in FIG. 5, in this embodiment of this application, the screenshot regions including the target object and captured from the candidate image frames may be collectively referred to as target image regions.

In some embodiments, the service server may perform quality assessment on each captured target object region including the target object to obtain a corresponding quality assessment result. Then, the service server may filter out blurred image frames in the candidate image frames shown in FIG. 5 according to the quality assessment results (for example, the candidate image frame 2*c* may be filtered out, not shown in the figure), and then determine, in the candidate image frames with the blurred image frames filtered out, a candidate image frame with the highest resolution (e.g., the candidate image frame 2*k*, not shown in the figure) to be the target image frame including the target object. It may be understood that the target image frame herein may be an optimal image frame (e.g., the image frame with the highest resolution) selected from the legitimate data stream. The optimal image frame herein refers to the candidate image frame in which the screenshot region with optimal image quality is located.

In some embodiments, the service server may perform, based on a currently constructed similar object database, face recognition on the target object (e.g., the face of the user 1 shown in FIG. 4) in the target image frame through a face recognition service to obtain the first recognition result. It may be understood that the face recognition service here may be used for identifying whether the face of the user 1 (i.e., the target user) is consistent with a face of the similar object (the similar object herein may be a similar user in a face recognition scenario) stored in the similar object database, and the target object may be determined to be the similar object stored in the similar object database if yes. This means that the object (i.e., the user 1) corresponding to the target object (i.e., the face of the user 1) belongs to the similar user group in which the similar user is located, and a recognition result that the user 1 belongs to the similar user group may be taken as the first recognition result. Then, step S102 below may be performed.

It may be understood that the target object herein may preferably be a face of a user in the face recognition scenario. In some embodiments, face recognition is a manner of biometric recognition. Therefore, in embodiments of some other scenarios, the first-type identity recognition may also be performed in other biometric recognition manners (such as iris recognition or fingerprint recognition). The biometric recognition manner adopted to perform the first-type identity recognition may vary in different embodiments.

Step S102: Acquire, in response to the first recognition result indicating that the target object is a similar object in the similar object database, a similar ID associated with the similar object, and acquire, from a similar service configuration library associated with the similar object database, K pattern recognition services configured for the similar ID.

K may be a positive integer. It may be understood that, in the face recognition scenario, the similar object database may be used for storing face image data of each similar user. That is, the face image data of each similar user may be image data formed by screenshot regions in which faces with optimal quality are located and captured by the service server from image data streams historically collected. In some embodiments, the computer device may encode the captured face image data for uniquely representing each similar user to obtain an ID of the similar user. It may be understood that, in this embodiment of this application, the ID of each similar user (i.e., each similar user ID) stored in the similar object database may be collectively referred to as a similar ID.

Figure 6:
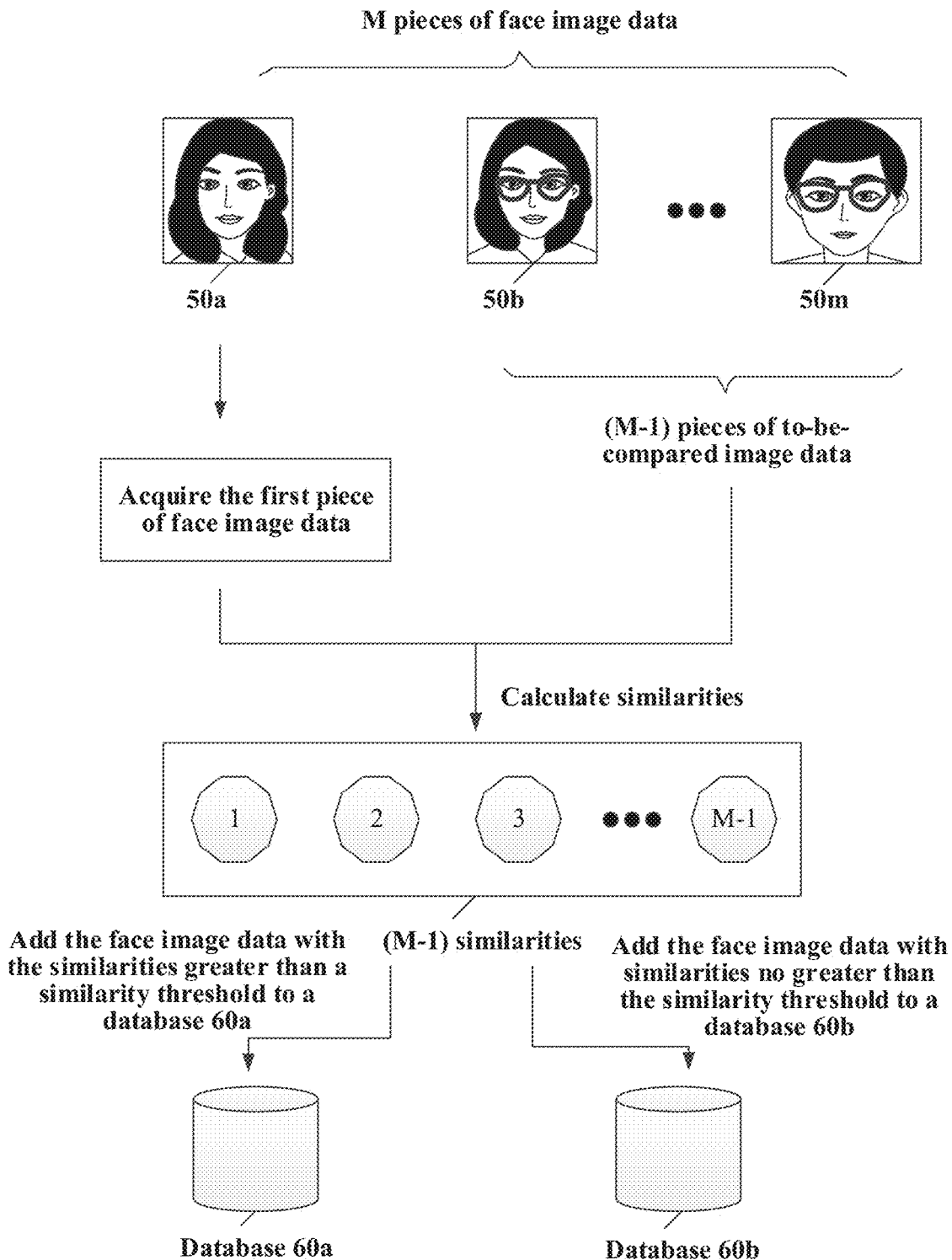
FIG. 6 is a schematic diagram of a scenario of constructing a similar object database according to an embodiment of this application.

FIG. 6 which is a schematic diagram of a scenario of constructing a similar object database according to an embodiment of this application may be relevant to other embodiments. As shown in FIG. 6, the service server may acquire an image frame of each user from a user image database (e.g., a face database). For ease of understanding, in this embodiment of this application, for example, a quantity of users in the user image database is M, and the image frames of the users acquired by the service server may be: optimal image frames of the M users acquired by the service server from a large number of stored image data streams.

As shown in FIG. 6, the M users here may be a user B1, a user B2, a user B3, . . . , and a user BM. As shown in FIG. 6, image data of the user B1 may be face image data 50a, image data of the user B2 may be face image data 50b, . . . , and image data of the user BM may be face image data 50m. For ease of understanding, to traverse the M users to find users belonging to the similar user group, in this embodiment of this application, an $i^{th}$ piece of face image data shown in FIG. 6 may be one-to-one compared with other pieces of face image data in M pieces of face image data (e.g., the remaining (M−1) pieces of face image data except the $i^{th}$ piece of face image data shown in FIG. 6) in advance to obtain face similarities (similarities for short) between the $i^{th}$ piece of face image data and the other pieces of face image data. Herein, i is a positive integer less than or equal to M.

As shown in FIG. 6, in this embodiment of this application, the first (i.e., i=1) piece of face image data (e.g., the face image data 50a) shown in FIG. 6 may be taken as target face image data, other pieces of face image data except the first piece of face image data (e.g., the face image data 50b, . . . , and the face image data 50m) may be taken as to-be-compared image data, and then the face image data 50a may be compared with each piece of to-be-compared image data in (M−1) pieces of to-be-compared image data to determine a similarity between a face in the face image data 50a and a face in each piece of the to-be-compared image data according to a comparison result. This means that (M−1) similarities can be obtained by calculation during the one-to-one comparison between the face image data 50a and the other pieces of face image data. The (M−1) similarities may include a similarity 1, a similarity 2, a similarity 3, . . . , and a similarity (M−1) shown in FIG. 6.

For ease of understanding, in this application, the similarity 1 is assumed to be the face similarity between the face image data 50a and the face image data 50b shown in FIG. 6. Similarly, by analogy, the similarity (M−1) may be the face similarity between the face image data 50a and the face image data 50m shown in FIG. 6. In some embodiments, if the service server determines that the similarities include a similarity greater than a similarity threshold, it may be determined that the user (i.e., the user B1) corresponding to the $i^{th}$ piece of face image data (e.g., the face image data 50a shown in FIG. 6) belongs to a first-type user, so that a similar ID (e.g., ID1) can be configured for the user (i.e., the user B1) corresponding to the $i^{th}$ piece of face image data (e.g., the face image data 50a shown in FIG. 6), and the similar ID (e.g., the ID1) of the $i^{th}$ piece of face image data can be added to a first-type database corresponding to the first-type user. The first-type database may be a database 60a shown in FIG. 6. In this embodiment, the service server may take the database 60a, to which the similar ID (e.g., the ID1) of the $i^{th}$ piece of face image data (e.g., the face image data 50a shown in FIG. 6) is added, as the similar object database. It may be understood that the similar object database herein may be a similar user group library, and users in the similar user group library may be users with similarities greater than the similarity threshold.

In some embodiments, in the face recognition scenario, to improve efficiency of image recognition, in this embodiment of this application, during the construction of the similar object database, when the similar ID configured for the $i^{th}$ piece of face image data is added to the first-type database corresponding to the first-type user, the $i^{th}$ piece of face image data may also be added to the first-type database for storage. In this way, the service server, when acquiring a new image data stream, may acquire an optimal image frame (i.e., the above target image frame) from the new image data stream to compare a face in the target image frame with faces in the face image data in the constructed similar object database, so as to improve efficiency of face comparison and help the service server to acquire the corresponding first recognition result as quickly as possible.

It is to be understood that, in the face recognition scenario, if the application service to be executed by the application client running in the target user terminal has a higher requirement on identity recognition, the service server corresponding to the application client, when recognizing through the face recognition service that the similarity between the user B1 and another user (e.g., the user B2) is greater than the similarity threshold, may classify the user B1 into the similar user group (i.e., it is considered that the user B1 belongs to the first-type user), and then may configure an ID (e.g., the above ID1) for the user B1 based on the face image data of the user B1, so as to add the ID of the user B1 to the database 60a shown in FIG. 6. Then, the database 60a to which the ID (e.g., the above ID1) for the user B1 is added may be collectively referred to as the similar object database.

Similarly, in this embodiment of this application, during the construction of the normal object database, when the object ID configured for the $i^{th}$ piece of face image data is added to the second-type database corresponding to the second-type user, the $i^{th}$ piece of face image data may also be added to the second-type database for storage. Details described in those embodiments may apply to other embodiments.

For example, it may be understood that, as shown in FIG. 6, the service server, after determining that the user B1 belongs to the first-type user (i.e., a highly similar user), may remove the user B1 and a user (e.g., the user B2) similar to the user B1 from a comparison queue corresponding to the M users. Therefore, a new $i^{th}$ piece of face image data (i.e., new target face image data) can be acquired from the remaining (M−2) persons in the comparison queue, new to-be-compared image data can be obtained, and then the new $i^{th}$ piece of face image data (i.e., the new target face image data) can be one-to-one compared with the new to-be-compared image data. It is determined that the service server has currently completed classification of the M users until no new to-be-compared image data exists in the comparison queue corresponding to the M users. For example, the user B1 and the user B2 in the M users may be classified into the database 60a (i.e., the first-type database) shown in FIG. 6, and the user BM in the M users is classified into the database 60b (i.e., the second-type database) shown in FIG. 6.

In some embodiments, to prevent misrecognition existing in the face recognition performed by the service server by using the above face recognition service, in this embodiment of this application, a corresponding quantity of pattern recognition services may also be configured for the similar ID of each user in the similar object database. For example, when the similarity of the $i^{th}$ piece of face image data (e.g., the face image data 50a shown in FIG. 6) is greater than the similarity threshold, the service server may configure N types of pattern recognition services for the similar ID of the $i^{th}$ piece of face image data based on the similarity of the $i^{th}$ piece of face image data and registered biometric information (e.g., iris information, fingerprint information, noseprint information, or the like) entered by the user (i.e., the user B1) corresponding to the $i^{th}$ piece of face image data. Herein, N may be a positive integer. One of the types corresponds to one of the pattern recognition services. It may be understood that N may include K. In some embodiments, the service server may add the N pattern recognition services to a configuration service database associated with the first-type user to obtain a similar service configuration library associated with the similar object database. For example, corresponding to the user B1 and the user B2 with a high similarity, a corresponding quantity of types (e.g., three types) of pattern recognition services may be configured for the similar ID (e.g., the ID1) of the user B1 according to types (e.g., three types) of biometric information entered by the user B1. Similarly, in this embodiment of this application, a corresponding quantity of types (e.g., two types) of pattern recognition services may also be configured for the similar ID (e.g., the ID2) of the user B2 according to types (e.g., two types) of biometric information entered by the user B2. It is to be understood that, in this embodiment of this application, types of pattern recognition services configured by the service server for similar IDs of other users stored in the similar object database are not enumerated.

In some embodiments, as shown in FIG. 6, if the similarities include no similarity greater than the similarity threshold, the service server may determine that the user corresponding to the $i^{th}$ piece of face image data (e.g., the face image data 50a shown in FIG. 6) belongs to a second-type user, so that another similar ID (i.e., an object ID, e.g., ID1') can be configured for the user corresponding to the $i^{th}$ piece of face image data (e.g., the face image data 50a shown in FIG. 6). In this embodiment, the service server may add the object ID (e.g., the ID1') of the $i^{th}$ piece of face image data (e.g., the face image data 50a shown in FIG. 6) to the second-type database corresponding to the second-type user. The second-type database herein may be the database 60b shown in FIG. 6. Then, the service server may collectively include the second-type database, to which the object ID of the $i^{th}$ piece of face image data is added, as the normal object database in some embodiments. It may be understood that the normal object database herein may be a non-similar user group library.

In some embodiments, after performing step S101 and before preforming step S102, the service server may perform the following step: If the first recognition result indicates that the target object does not belong to similar objects in the similar object database, the service server may acquire an object ID of a user corresponding to the target object from the constructed normal object database (e.g., the database 60b shown in FIG. 6), and return the object ID to the application client as a normal identity authentication result. The normal identity authentication result may be used for instructing the application client to execute the application service in response to the object ID being the same as a cached ID. This means that the service server, when determining that the target object (i.e., the face of the target user) in a currently acquired image data stream does not belong to the similar user group, may compare the optimal image frame (i.e., the above target image frame) acquired from the image database with face image data in a normal image database. Therefore, when similarities are greater than the similarity threshold, an object ID of a user with the highest similarity to the target user can be acquired, and then the above application client can be allowed to directly execute the above application service based on the object ID.

Step S103: Perform second-type identity recognition on the target object in the image data stream through the K pattern recognition services respectively to obtain K second recognition results.

In practical applications, the service server may output the K pattern recognition services to a service scheduling component, and configure the image data stream for the K pattern recognition services through the service scheduling component. In some embodiments, the service server may acquire a $j^{th}$ pattern recognition service from the K pattern recognition services. j may be a positive integer less than or equal to K. In some embodiments, the service server may perform second-type identity recognition on the target object in the image data stream through the $j^{th}$ pattern recognition service until the second-type identity recognition is performed on the target object in the image data stream through each pattern recognition service to obtain the K second recognition results.

It is to be understood that if the user (i.e., the target user, e.g., the user 1) corresponding to the application client belongs to the similar user group (i.e., the first-type user), multiple pattern recognition services may be acquired from a constructed similar service configuration library through a highly similar recognition scheduling service (i.e., the above K pattern recognition services may be acquired). Therefore, the image data stream acquired in step S101 can be transmitted, through the streaming media service in the service server, to the service scheduling component configured to provide a highly similar recognition service. The image data stream can be distributed to the K pattern recognition services through the service scheduling component, enabling the K pattern recognition services to extract image features from image frames in the image data stream in parallel. This may be used to compare the corresponding type of features extracted with image features of image frames corresponding to other biological information historically collected and stored in a similar service configuration library, so as to obtain the K second recognition results.

It may be understood that, if the K second recognition results indicate that the target object (e.g., the face of the target user) in the image data stream belongs to a same user and the user is the same as the user corresponding to the similar object recognized in the first recognition result, the identity authentication is considered successful, and then step S104 may be performed. In some embodiments, if one or more of the K second recognition results indicate that the target object (e.g., the face of the target user) in the image data stream does not belong to the same user, it may be determined that the identity authentication fails. Therefore, when the target object and the similar object do not belong to a same object, an identity authentication failure result for the target object can be generated, and the identity authentication failure result can be returned to the application client to cause the application client to output the identity authentication failure result on an application display interface.

Step S104: Output, in response to the K second recognition results indicating that the target object is the similar object, the similar ID to the application client to cause the application client to execute an application service based on the similar ID.

In one embodiment, the service server may determine that the target object and the similar object belong to a same object if the K second recognition results indicate that an ID of the target object is a similar ID mapped by the similar object. In some embodiments, the service server may take the similar ID as a similar identity authentication result, and return the similar identity authentication result to the application client. The similar identity authentication result is used for instructing the application client to execute the application service in response to the object ID being the same as a cached ID.

The computer device in this embodiment of this application, when acquiring an image data stream including a target object and collected by an application client, may perform first-type identity recognition on the target object in the image data stream based on a similar object database to obtain a first recognition result. It may be understood that the target object herein may include a face of a user (e.g., the target user). In this embodiment, the first-type identity recognition herein may be face recognition. In some embodiments, if the first recognition result indicates that the target object is a similar object in the similar object database (e.g., the similar user group), the computer device may acquire a similar ID associated with the similar object, and acquire, from a similar service configuration library associated with the similar object database, K pattern recognition services configured for the similar ID. K may be a positive integer. It may be understood that the K pattern recognition services here may include an iris recognition service, a bone recognition service, a noseprint recognition service, and other examples in various embodiments. In some embodiments, the computer device may perform second-type identity recognition on the target object in the image data stream through the K pattern recognition services respectively to obtain K second recognition results. It is to be understood that the second-type identity recognition here may be multiple parallel pattern recognition services. One type of pattern recognition service is one pattern recognition service. In some embodiments, if the K second recognition results indicate that the target object is the similar object, the computer device may output the similar ID to the application client to cause the application client to execute an application service based on the similar ID. As can be seen, in this embodiment of this application, the computer device, when recognizing that an object (i.e., the foregoing target user) corresponding to the target object belongs to a similar user group, may perform identity recognition again on the target object in the image data stream collected by the application client through another pattern recognition service (i.e., the foregoing K pattern recognition services). Therefore, user identity of the target object can be determined when target objects recognized by the K pattern recognition services are all consistent with the similar object recognized by the above face recognition, and the similar ID (i.e., identification information for uniquely identifying user identity of a user to which the target object belongs) mapped by the foregoing similar object can be returned to the application client to ensure accuracy of object recognition. In this embodiment, the application client may perform comparison according to the similar ID accurately recognized and a cached ID associated with the image data stream and cached in the application client, and then may execute a corresponding application service (e.g., a payment service) when the similar ID is consistent with the cached ID, so as to ensure reliability of service execution.

Figure 7:
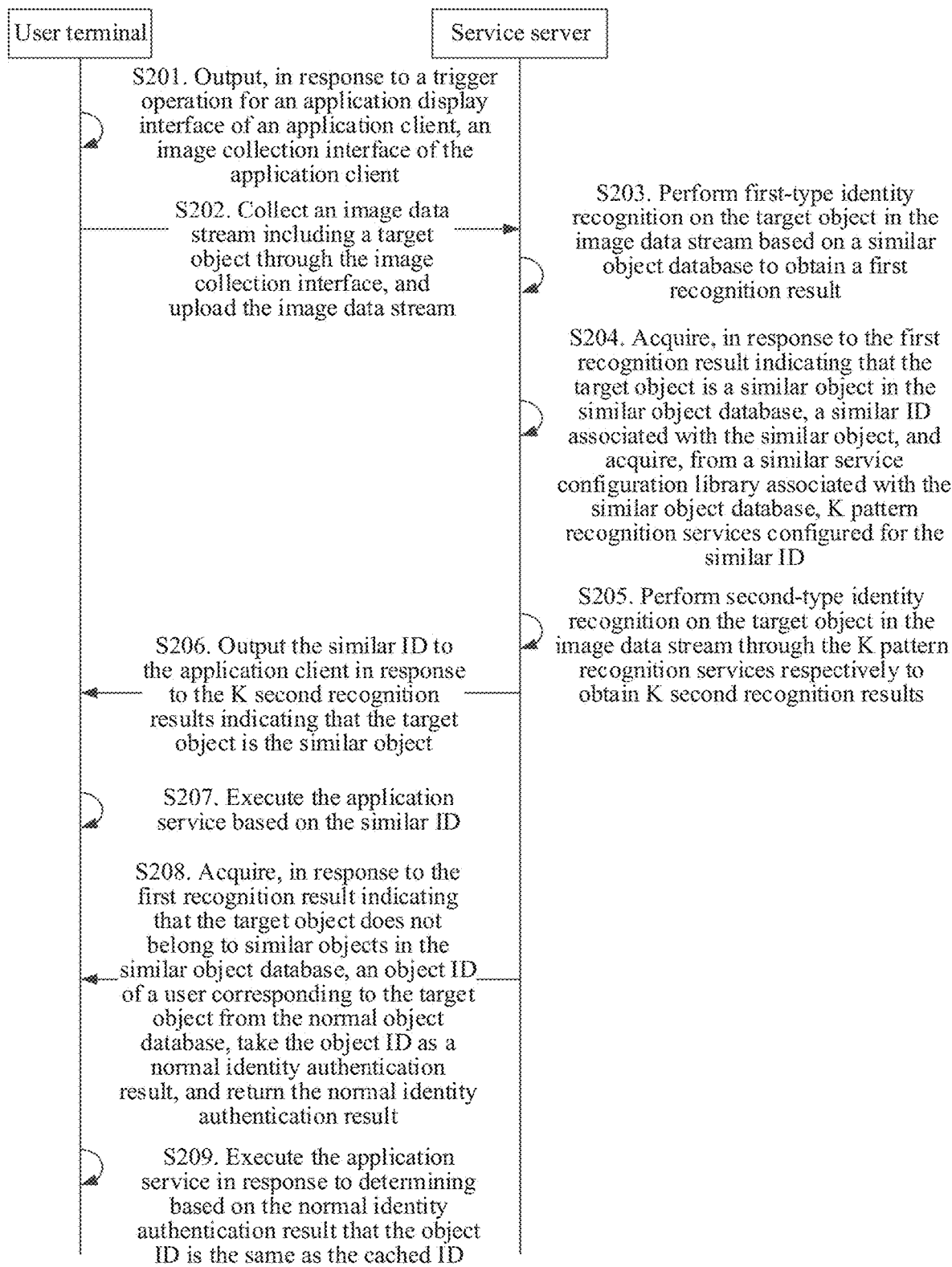
FIG. 7 is a schematic flowchart of an image data processing method according to an embodiment of this application.

Referring to FIG. 7, FIG. 7 is a schematic flowchart of an image data processing method according to an embodiment of this application. In some embodiments, the method according to this embodiment of this application may be performed by a computer device. The computer device herein includes a user terminal or a service server in one embodiment. For ease of understanding, in this embodiment of this application, for example, the user terminal interacts with the service server to perform the method, the user terminal may be the target user terminal in the foregoing embodiment corresponding to FIG. 2, and the service server herein may be the service server in the foregoing embodiment corresponding to FIG. 2. As shown in FIG. 7, the method may include at least the following step S201 to step S209:

Step S201: A user terminal outputs, in response to a trigger operation for an application display interface of an application client, an image collection interface of the application client.

Herein, the application client may be a social client, a payment client, an access control client, or the like. For example, the application client is the payment client, and when a user triggers a payment operation, authentication on identity information of the user is involved, and then image collection and identity recognition for the user are triggered.

Step S202: The user terminal collects an image data stream including a target object through the image collection interface, and uploads the image data stream to a service server.

Step S203: The service server performs first-type identity recognition on the target object in the image data stream based on a similar object database to obtain a first recognition result.

It may be understood that the service server may acquire, from a service data packet uploaded by the user terminal, the image data stream including the target object collected by the application client. For example, when the user terminal collects the image data stream including the target object, the user terminal may sign the image data stream through an application private key of the application client to obtain application signature information corresponding to the application client. It is to be understood that, to ensure security of data transmission between the user terminal and the service server, prior to uploading the image data stream to the service server, the user terminal in this embodiment of this application may encapsulate, in advance, the application signature information obtained by signature and the image data stream to obtain a service data packet carrying the application signature information. In this way, the service server, when acquiring the service data packet, may parse the service data packet to restore the application signature information and the image data stream. It may be understood that the service server further needs to verify reliability of a data source of the image data stream before using the image data stream for identity authentication. For example, the service server may perform, through an application public key of the application client, signature verification on the application signature information obtained by parsing, and then determine that the data source of the image data stream parsed by the service server is legitimate when the signature verification is successful. Therefore, the image data stream parsed by the service server can be determined to be a legitimate data stream. In some embodiments, the service server may perform first-type identity recognition on the target object in the legitimate data stream based on a similar object database to obtain a first recognition result.

An embodiment in which the service server performs first-type identity recognition (e.g., face recognition) or first identification on the target object in the legitimate data stream may be obtained with reference to the description of the process of face recognition by using a face recognition service in the foregoing embodiment corresponding to FIG. 3. Details described in those embodiments may apply to other embodiments.

It may be understood that, if the first recognition result indicates that the service server determines, by using the face recognition service, that a similarity (e.g., 95%) between the target object (e.g., a face of a user) in the legitimate data stream and a similar object (e.g., a face of a highly similar user) stored in the similar object database is greater than a similarity threshold (e.g., 90%), the target object in the legitimate data stream may be temporarily determined to be the similar object in the similar object database, and then step S204 below may be performed to perform multiple identity authentication, so as to effectively resolve the problem of misrecognition existing during the first-type identity recognition (e.g., face recognition).

In some embodiments, if the first recognition result indicates that the service server determines, by using the face recognition service, that a similarity (e.g., 85%) between the target object (e.g., a face of a user) in the legitimate data stream and a similar object (e.g., a face of a highly similar user) stored in the similar object database is less than or equal to a similarity threshold (e.g., 90%), the target object in the legitimate data stream may be determined to be a normal object (i.e., a non-similar user) in the above non-similar object database (i.e., the normal object database), and then step S208 below may be performed.

Step S204: The service server acquires, in response to the first recognition result indicating that the target object is a similar object in the similar object database, a similar ID associated with the similar object, and acquires, from a similar service configuration library associated with the similar object database, K pattern recognition services configured for the similar ID. K is a positive integer.

It may be understood that a manner of constructing the similar object database herein may be obtained with reference to the description of the process of obtaining the first-type database in the foregoing embodiment corresponding to FIG. 3. Details described in those embodiments may apply to other embodiments.

In addition, it may be understood that, prior to the first-type identity recognition, the service server may also pre-construct the similar object database for storing a similar ID of each user and construct the similar service configuration database associated with the similar object database. The similar service configuration database herein may be used for storing one or more types of pattern recognition services corresponding to the similar ID of each user. A manner of constructing the similar service configuration database may be obtained with reference to the description of the process of constructing the similar service configuration library in the foregoing embodiment corresponding to FIG. 3. Details described in those embodiments may apply to other embodiments.

Step S205: The service server performs second-type identity recognition on the target object in the image data stream through the K pattern recognition services respectively to obtain K second recognition results.

It may be understood that, after the service server performs step S205, if the K second recognition results indicate that the target object is the similar object, that is, recognition results obtained by the service server by using the K pattern recognition services are completely consistent with the recognition result obtained by the service server by using the above face recognition service, the service server may perform step S206 below.

In some embodiments, if the K second recognition results include at least one second recognition result and do not indicate that the ID of the target object is the similar ID mapped by the similar object, it indirectly indicates that the recognition results obtained by the service server by using the K parallel pattern recognition services are not completely consistent with the recognition result obtained by the service server by using the above face recognition service, and then it may be quickly determined that the target object and the similar object do not belong to the same object. In some embodiments, when the target object and the similar object do not belong to the same object, the service server may generate an identity authentication failure result for the target object, and return the identity authentication failure result to the application client to cause the application client to output the identity authentication failure result on an application display interface.

Step S206: The service server outputs the similar ID to the application client in response to the K second recognition results indicating that the target object is the similar object.

It may be understood that, after the service server performs step S205 to step S206, the user terminal may receive a similar ID of the target object returned by the service server based on the K pattern recognition services, and in this embodiment, the user terminal may perform step S207 below to execute an application service of the application client based on the similar ID.

Step S207: The user terminal executes the application service based on the similar ID.

It may be understood that the user terminal, when acquiring the similar ID returned by the service server, may compare the cached ID of the above image data stream stored in a local terminal with the similar ID. If the cached ID is consistent with the similar ID, the user terminal may allow the application client to execute a corresponding application service (for example, the application service herein may include a payment service; for example, movie tickets can be group-purchased in the application client (for example, a Tencent Video client) by face-scanning payment, so that a user corresponding to the user terminal can invite others with a same interest in watching movies to watch the movies online in a same virtual room).

In some embodiments, in step S208, in response to the first recognition result indicating that the target object does not belong to similar objects in the similar object database, the service server may acquire an object ID of a user corresponding to the target object from the normal object database, take the object ID as a normal identity authentication result, and return the normal identity authentication result to the application client.

It may be understood that a manner of constructing the normal object database herein may be obtained with reference to the description of the process of obtaining the second-type database in the foregoing embodiment corresponding to FIG. 3. Details described in those embodiments may apply to other embodiments.

Step S209: The application client in the user terminal executes the application service in response to determining based on the normal identity authentication result that the object ID is the same as the cached ID.

Figure 8:
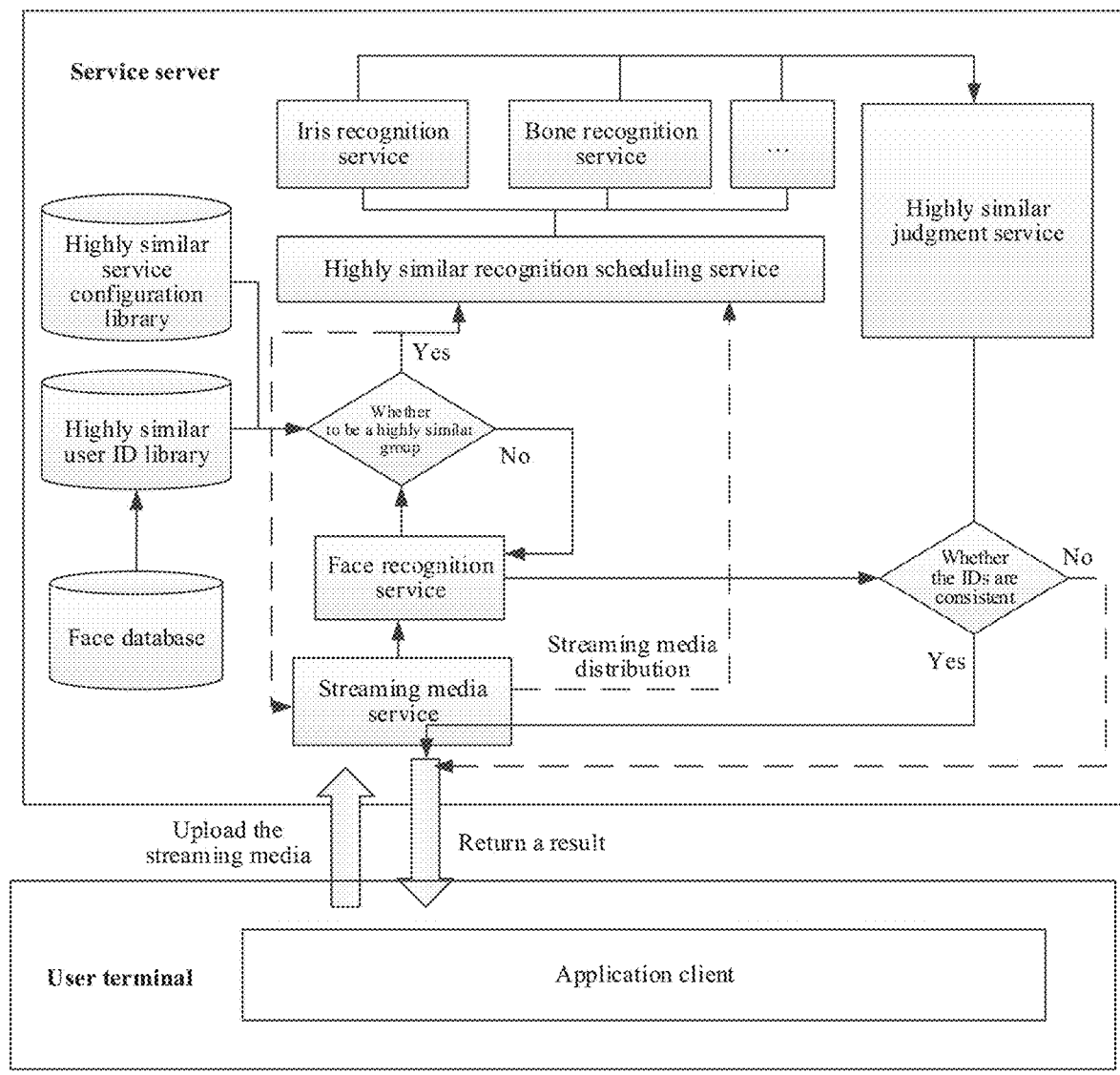
FIG. 8 is a schematic diagram of a scenario of resolving misrecognition of a highly similar group through multiple pattern recognition services according to an embodiment of this application.

For ease of understanding, in some embodiments, referring to FIG. 8, FIG. 8 is a schematic diagram of a scenario of resolving misrecognition of a highly similar group through multiple pattern recognition services according to an embodiment of this application. It may be understood that, when an application client shown in FIG. 8 runs in a user terminal shown in FIG. 8, the user terminal may invoke a camera (e.g., a front camera) of the user terminal through the application client (e.g., a social client) to collect one or more pieces of image data for a user (e.g., a user D).

It may be understood that, when the user D enables an image collection function, the user terminal may perform, through the application client shown in FIG. 6, object detection on an object presented on an image collection interface. If it is detected that the object in the image collection interface is the user D, a face recognition function is enabled, and then a service scenario of the application client may be determined to be the above face recognition scenario. It may be understood that, as shown in FIG. 8, the user terminal, when determining that the service scenario is the face recognition scenario, may invoke the camera to continue the collection and then upload continuously collected image data to a service server shown in FIG. 8 as a streaming media.

It may be understood that the streaming media herein means compressing a series of media data (the collected image data here) and then continuously transmitting an encapsulated data packet (i.e., the above service data packet) to the service server over a network, so that the service server can constantly acquire an image data stream including the target object to perform face recognition (i.e., the above first-type identity recognition) through the face recognition service provided by a streaming media backend (i.e., a service provided by a face recognition service component) shown in FIG. 8.

It may be understood that the streaming media service (i.e., a service provided by a streaming media service component) shown in FIG. 8 can verify the image data stream from the user terminal. An embodiment in which the service server verifies the image data stream may be obtained with reference to the description of the process of obtaining the legitimate data stream in the foregoing embodiment corresponding to FIG. 3. Details described in those embodiments may apply to other embodiments. In some embodiments, as shown in FIG. 8, the service server, when determining according to face image data stored in a highly similar user ID library (i.e., the above similar object database) shown in FIG. 8 that the target object (e.g., a face of the user D) in the image data stream belongs to a highly similar user (e.g., a user D') in a highly similar group, may acquire a similar ID (e.g., ID4) of the user D' from the highly similar user ID library (i.e., the above similar object database) shown in FIG. 8. As shown in FIG. 8, the highly similar user ID library (i.e., the above similar object database) herein is determined after similarity comparison (e.g., manual comparison) on a large number of face image data in a face database shown in FIG. 8. An embodiment of constructing the highly similar user ID library may be obtained with reference to the description of the process of constructing the similar object database in the foregoing embodiment corresponding to FIG. 3. Details described in those embodiments may apply to other embodiments.

In some embodiments, the service server may read service configuration information from a highly similar service configuration library (i.e., the above similar service configuration library) shown in FIG. 8 through a highly similar recognition scheduling service (i.e., the service provided by the service scheduling component) shown in FIG. 8 to acquire K pattern recognition services configured for the user D'. K patterns shown in FIG. 8 may include an iris recognition service, a bone recognition service, and other recognition services (e.g., a noseprint recognition service) shown in FIG. 8. For ease of understanding, in this embodiment of the application, for example, the K pattern recognition services configured for the similar ID (e.g., ID4) of the user D' are an iris recognition service, a bone recognition service, and a noseprint recognition service. As shown in FIG. 8, the service server may distribute, through the streaming media service component shown in FIG. 8, the image data stream from the user terminal to the pattern recognition services associated with the service scheduling component, so that the pattern recognition services each may perform second-type identity recognition on the target object (i.e., the face of the above user D) in the acquired image data stream to obtain a recognition result 1 corresponding to the iris recognition service, a recognition result 2 corresponding to the bone recognition service, and a recognition result 3 corresponding to the noseprint recognition service. In this embodiment, the service server may collectively include the recognition results (i.e., the recognition result 1, the recognition result 2, and the recognition result 3) recognized by the pattern recognition services as second recognition results in some embodiments.

In some embodiments, as shown in FIG. 8, the service server, after obtaining the second recognition results, may compare the 3 (i.e., K=3) second recognition results with the first recognition result through a highly similar judgment service (i.e., a service provided by a highly similar judgment service component) shown in FIG. 8 to determine whether a similar user recognized by each second recognition result and the similar user recognized by the first recognition result are a same user. If the similar users are the same user, it may be indirectly determined that similar IDs of similar users obtained after multiple identity authentication are the above ID4. Then, when the IDs are consistent, the similar ID (e.g., ID4) may be taken as a similar identity authentication result, and the similar identity authentication result may be returned to the application client shown in FIG. 8 through the above streaming media service component (i.e., a component for providing the streaming media service shown in FIG. 8).

In some embodiments, if the 3 second recognition results include one or more second recognition results and do not indicate that the ID of the target object is the similar ID mapped by the similar object, it may be determined that the target object and the similar object do not belong to the same object, and then an identity authentication failure result may be returned to the application client shown in FIG. 8 in this embodiment.

It may be understood that, in this embodiment of this application, the above similar identity authentication result or identity authentication failure result may be collectively referred to as a result needing to be returned to the user terminal. In some embodiments, it may be further understood that, as shown in FIG. 8, if the service server determines based on the above first recognition result that the target object in the image data stream does not belong to the highly similar group shown in FIG. 8, it may be indirectly determined that the target object in the image data stream belongs to a normal user in the above normal object database. This means that the above user D does not belong to the similar user. Therefore, an object ID of the user D can be acquired from the above normal object database, so that the object ID can be taken as a normal identity authentication result, and the normal identity authentication result can be returned to the application client shown in FIG. 8.

Figure 9:
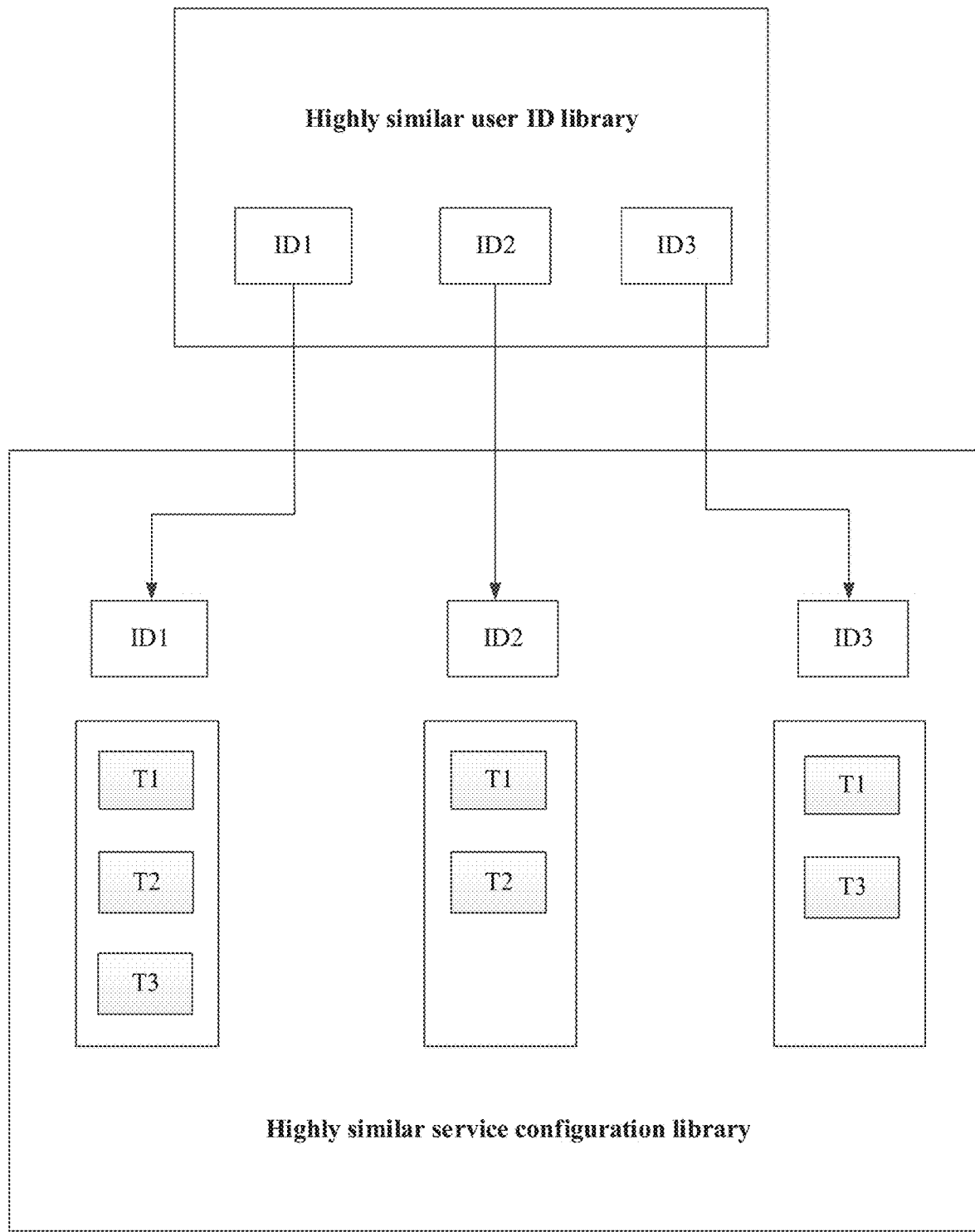
FIG. 9 is a schematic diagram of a scenario of establishing a highly similar service configuration library according to an embodiment of this application.

It may be understood that, in this embodiment of this application, before the service server acquires the K pattern recognition services from a similar service configuration library through the highly similar recognition scheduling service shown in FIG. 8, the service server may also configure a corresponding quantity of pattern recognition services for the ID of each user in the highly similar user ID library in advance. For ease of understanding, in some embodiments, referring to FIG. 9, FIG. 9 is a schematic diagram of a scenario of establishing a highly similar service configuration library according to an embodiment of this application. A highly similar user ID library shown in FIG. 9 may be the above similar object database. The similar object database as shown in FIG. 9 may include similar IDs of 3 similar users shown in FIG. 9. For example, a similar ID of a similar user 1 (e.g., the user B1 in the foregoing embodiment corresponding to FIG. 6) may be a user ID1 shown in FIG. 9. In another example, a similar ID of a similar user 2 (e.g., the user B2 in the foregoing embodiment corresponding to FIG. 6) may be a user ID2 shown in FIG. 9. By analogy, a similar ID of a similar user 3 (e.g., the user B3, not shown in the foregoing embodiment corresponding to FIG. 6) may be a user ID3 shown in FIG. 9.

It may be understood that, for the 3 users, the service server may obtain a score of each similar user according to high similarities between different similar users, so as to configure a corresponding quantity of pattern recognition services for the user IDs of the similar users according to the score of each similar user and/or other biological information entered by each similar user during pre-registration.

For example, as shown in FIG. 9, the service server may configure 3 (i.e., N=3) pattern recognition services (i.e., a pattern recognition service T1, a pattern recognition service T2, and a pattern recognition service T3) shown in FIG. 9 for the user ID1 of the user B1 based on a score (e.g., 95) of the user B1 and three types of biological information entered by the user B1. The pattern recognition service T1 may be the iris recognition service in the foregoing embodiment corresponding to FIG. 8. In another example, as shown in FIG. 9, the service server may configure 2 (i.e., N=2) pattern recognition services (i.e., a pattern recognition service T1 and a pattern recognition service T2) shown in FIG. 9 for the user ID2 of the user B2 based on a score (e.g., 95) of the user B2 and two types of biological information entered by the user B1. By analogy, as shown in FIG. 9, the service server may configure 2 (i.e., N=2) pattern recognition services (i.e., a pattern recognition service T1 and a pattern recognition service T3) shown in FIG. 9 for the user ID3 of the user B3 based on a score (e.g., 99) of the user B3 and another two types of biological information entered by the user B1. It is to be understood that the N pattern recognition services configured by the service server for each similar user may include the 3 types of pattern recognition services shown in FIG. 9 in one embodiment, which are not enumerated herein. In this embodiment, the service server may construct a highly similar service configuration library (i.e., the above similar service configuration library) based on the corresponding quantity of pattern recognition services configured for the 3 similar users.

In some embodiments, the user terminal, if detecting that the object on the image collection interface is an animal (for example, a puppy), may enable an animal recognition function, and then determine the service scenario of the application client as the above animal recognition scenario. This means that, when the user D currently holding the user terminal discovers a stray puppy, multiple identity recognition may be performed on the animal with the method according to this embodiment of this application to finally confirm a real ID of the puppy, i.e., whether the puppy belongs to a stray dog in a stray dog cluster (i.e., the similar object database). If yes, the user terminal may generate management prompt information for the stray dog based on the ID of the stray dog returned by the service server, and then quickly and accurately help a relevant unit (e.g., an animal management department) to supervise the stray puppy.

In this embodiment of this application, the computer device, when recognizing that an object (i.e., the foregoing target user) corresponding to the target object belongs to a similar user group, may perform identity recognition again on the target object in the image data stream collected by the application client through another pattern recognition service (i.e., the foregoing K pattern recognition services). Therefore, user identity of the target object can be determined when target objects recognized by the K pattern recognition services are all consistent with the similar object recognized by the above face recognition, and the similar ID (i.e., identification information for uniquely identifying user identity of a user to which the target object belongs) mapped by the foregoing similar object can be returned to the application client to ensure accuracy of object recognition. In this embodiment, the application client may perform comparison according to the similar ID accurately recognized and a cached ID associated with the image data stream and cached in the application client, and then may execute a corresponding application service (e.g., a payment service) when the similar ID is consistent with the cached ID, so as to ensure reliability of service execution. It is to be understood that, in this embodiment of this application, integration of components corresponding to multiple pattern recognition services into a same computer device can effectively reduce dependency on hardware in the object recognition scenario, so as to improve user experience and then enhance viscosity between the user and the application client.

Figure 10:
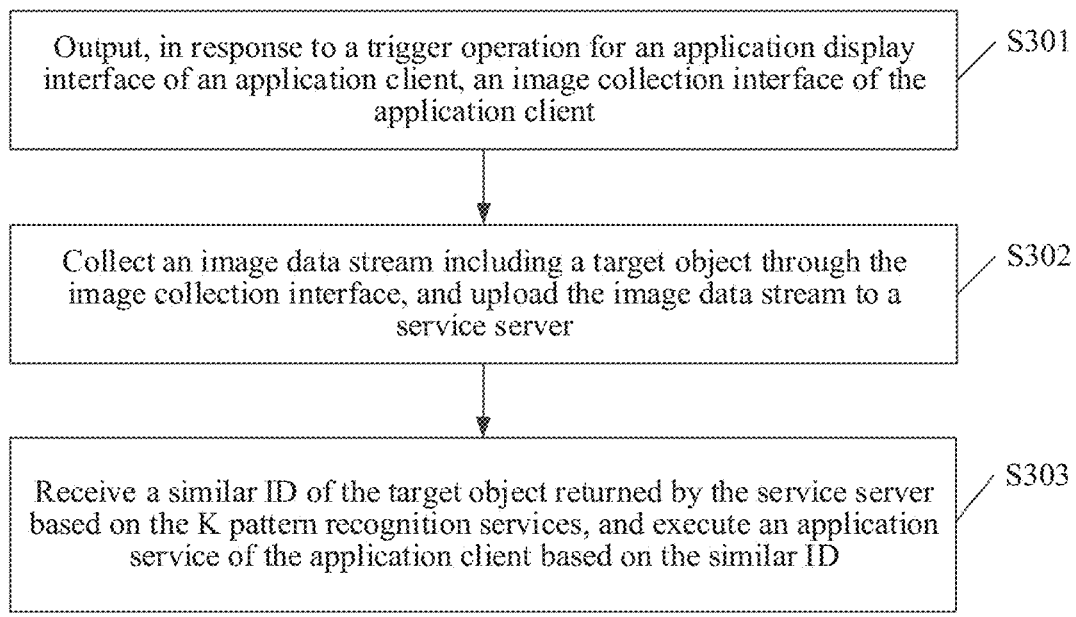
FIG. 10 is a schematic flowchart of an image data processing method according to an embodiment of this application.

In some embodiments, referring to FIG. 10, FIG. 10 is a schematic flowchart of an image data processing method according to an embodiment of this application. The method may be performed by the above computer device. The computer device herein may be a user terminal. The user terminal may be the target user terminal in the foregoing embodiment corresponding to FIG. 2. The method may include the following step S301 to step S303:

Step S301: Output, in response to a trigger operation for an application display interface of an application client, an image collection interface of the application client.

Step S302: Collect an image data stream including a target object through the image collection interface, and upload the image data stream to a service server.

It may be understood that, when the user terminal completes step S302, the service server may acquire the image data stream, and then may perform first-type identity recognition on the target object in the image data stream based on a similar object database to obtain a first recognition result. It may be understood that the first recognition result herein is used for instructing the service server to acquire, from a similar service configuration library associated with the similar object database, K pattern recognition services for performing second-type identity recognition on the target object when the target object is a similar object in the similar object database, to perform secondary verification on the identity of the user corresponding to the user terminal through the K pattern recognition services to resolve misrecognition in the highly similar group.

Step S303: Receive a similar ID of the target object returned by the service server based on the K pattern recognition services, and execute an application service of the application client based on the similar ID.

It may be understood that embodiments of step S301 to step S303 may be obtained with reference to the description of the user terminal in the foregoing embodiment corresponding to FIG. 7. Details described in those embodiments may apply to other embodiments.

As can be seen, in this embodiment of this application, when the user (e.g., the user 2) corresponding to the application client is recognized for the first time as a highly similar user (e.g., the user 3) in a similar user group, secondary verification may be performed on the identity of the user 2 through multiple parallel pattern recognition services. Therefore, when it is recognized through each pattern recognition service that the user 2 belongs to a same highly similar user in the similar user group, it may be ensured that the user 2 and the highly similar user (e.g., the user 3) in the similar user group are a same user, and then a similar ID of the highly similar user (e.g., the user 3) in the similar user group may be outputted to the application client, so that the application client can compare a cached ID locally stored with a received ID, and if the cached ID is the same as the received ID, an application service (e.g., a payment service) corresponding to the application client may be executed.

Figure 11:
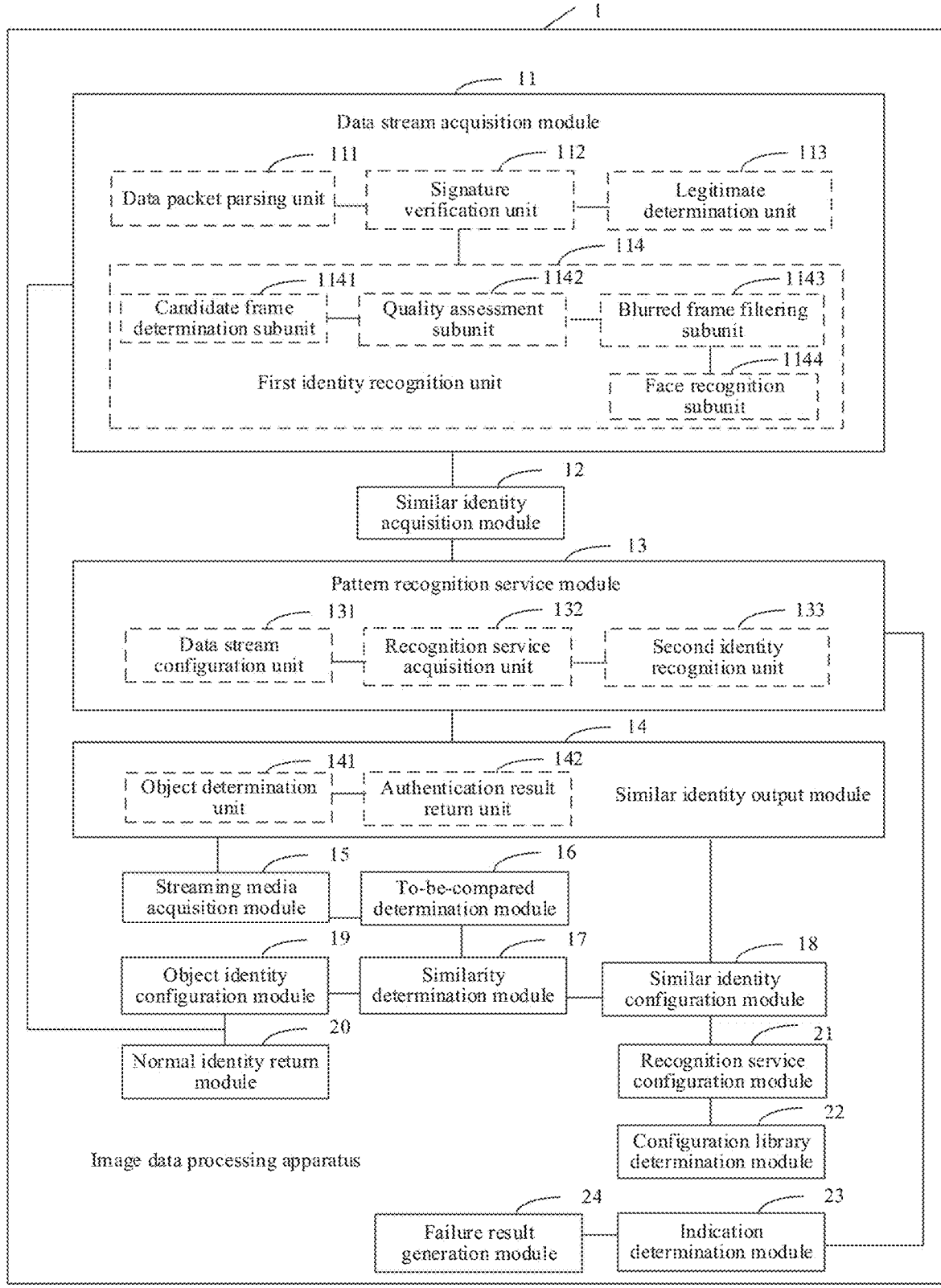
FIG. 11 is a schematic structural diagram of an image data processing apparatus according to an embodiment of this application.

In some embodiments, referring to FIG. 11, FIG. 11 is a schematic structural diagram of an image data processing apparatus according to an embodiment of this application. The above image data processing apparatus 1 may be a computer program (including program code) running in a computer device. For example, the image data processing apparatus 1 may be application software. The apparatus may be configured to perform corresponding steps in the method according to this embodiment of this application. The image data processing apparatus 1 may include: a data stream acquisition module 11, a similar identity acquisition module 12, a pattern recognition service module 13, and a similar identity output module 14. In some embodiments, the image data processing apparatus 1 may further include: a streaming media acquisition module 15, a to-be-compared determination module 16, a similarity determination module 17, a similar identity configuration module 18, an object identity configuration module 19, a normal identity return module 20, a recognition service configuration module 21, a configuration library determination module 22, an indication determination module 23, and a failure result generation module 24.

The data stream acquisition module 11 is configured to acquire an image data stream including a target object and collected by an application client, and perform first-type identity recognition on the target object in the image data stream based on a similar object database to obtain a first recognition result.

The data stream acquisition module 11 includes a data packet parsing unit 111, a signature verification unit 112, a legitimate determination unit 113, and a first identity recognition unit 114.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The data packet parsing unit 111 is configured to acquire a service data packet uploaded by the application client, and parse the service data packet through a streaming media service associated with the application client to obtain application signature information corresponding to the application client and the image data stream including the target object. The application signature information is obtained after the application client signs the collected image data stream through an application private key.

The signature verification unit 112 is configured to perform signature verification on the application signature information through an application public key corresponding to the application private key.

The legitimate determination unit 113 is configured to determine, in response to the signature verification being successful, the application client transmitting the image data stream to be a legitimate client, and determine that the image data stream belongs to a legitimate data stream associated with an associated application service of the application client.

The first identity recognition unit 114 is configured to acquire a target image frame including a target object from the legitimate data stream, and perform first-type identity recognition on the target object in the target image frame based on the similar object database to obtain the first recognition result.

The target object includes a face of a target user.

The first identity recognition unit 114 includes: a candidate frame determination subunit 1141, a quality assessment subunit 1142, a blurred frame filtering subunit 1143, and a face recognition subunit 1144.

The candidate frame determination subunit 1141 is configured to serialize the legitimate data stream to obtain an initial image sequence corresponding to the legitimate data stream, and take each image frame of the initial image sequence as a candidate image frame.

The quality assessment subunit 1142 is configured to determine target object regions including the target object in the candidate image frames, capture the corresponding target object regions including the target object from the candidate image frames, and perform quality assessment on each of the target object regions including the target object to obtain a quality assessment result.

The blurred frame filtering subunit 1143 is configured to filter out blurred image frames in the candidate image frames according to the quality assessment results, and determine, in the candidate image frames with the blurred image frames filtered out, a candidate image frame with the highest resolution to be the target image frame including the target object.

The face recognition subunit 1144 is configured to perform face recognition on the target object in the target image frame based on the similar object database to obtain the first recognition result.

Embodiments of the candidate frame determination subunit 1141, the quality assessment subunit 1142, the blurred frame filtering subunit 1143, and the face recognition subunit 1144 may be obtained with reference to the description of the process of face recognition in the foregoing embodiment corresponding to FIG. 3. Details described in those embodiments may apply to other embodiments.

Embodiments of the data packet parsing unit 111, the signature verification unit 112, the legitimate determination unit 113, and the first identity recognition unit 114 may be obtained with reference to the description of the process of first-type identity recognition in the foregoing embodiment corresponding to FIG. 3. Details described in those embodiments may apply to other embodiments.

The similar identity acquisition module 12 is configured to acquire, in response to the first recognition result indicating that the target object is a similar object in the similar object database, a similar ID associated with the similar object, and acquire, from a similar service configuration library associated with the similar object database, K pattern recognition services configured for the similar ID; K being a positive integer.

The pattern recognition service module 13 is configured to perform second-type identity recognition on the target object in the image data stream through the K pattern recognition services respectively to obtain K second recognition results.

The pattern recognition service module 13 includes: a data stream configuration unit 131, a recognition service acquisition unit 132, and a second identity recognition unit 133.

The data stream configuration unit 131 is configured to output the K pattern recognition services to a service scheduling component, and configure the image data stream for the K pattern recognition services through the service scheduling component.

The recognition service acquisition unit 132 is configured to acquire a $j^{th}$ pattern recognition service from the K pattern recognition services; j being a positive integer less than or equal to K.

The second identity recognition unit 133 is configured to perform second-type identity recognition on the target object in the image data stream through the $j^{th}$ pattern recognition service until the second-type identity recognition is performed on the target object in the image data stream through each pattern recognition service to obtain the K second recognition results.

Embodiments of the data stream configuration unit 131, the recognition service acquisition unit 132, and the second identity recognition unit 133 may be obtained with reference to the description of the K pattern recognition services in the foregoing embodiment corresponding to FIG. 3. Details described in those embodiments may apply to other embodiments.

The similar identity output module 14 is configured to output, in response to the K second recognition results indicating that the target object is the similar object, the similar ID to the application client to cause the application client to execute an application service based on the similar ID.

The similar identity output module 14 includes: an object determination unit 141 and an authentication result return unit 142.

The object determination unit 141 is configured to determine that the target object and the similar object belong to a same object if the K second recognition results indicate that an ID of the target object is a similar ID mapped by the similar object.

The authentication result return unit 142 is configured to take the similar ID as a similar identity authentication result, and return the similar identity authentication result to the application client. The similar identity authentication result is used for instructing the application client to execute the application service in response to the object ID being the same as a cached ID.

Embodiment of the object determination unit 141 and the authentication result return unit 142 may be obtained with reference to the description of step S104 in the foregoing embodiment corresponding to FIG. 3. Details described in those embodiments may apply to other embodiments.

In some embodiments, the streaming media acquisition module 15 is configured to acquire streaming media information of M users; one piece of the streaming media information including face image data of one of the users; M being a positive integer.

The to-be-compared determination module 16 is configured to acquire an $i^{th}$ piece of face image data from M pieces of face image data, and take the face image data in the M pieces of face image data except the $i^{th}$ piece of face image data as to-be-compared image data; i being a positive integer less than or equal to M.

The similarity determination module 17 is configured to compare the $i^{th}$ piece of face image data with the to-be-compared image data, and determine similarities between a face in the $i^{th}$ piece of face image data and faces in the to-be-compared image data according to comparison results.

The similar identity configuration module 18 is configured to determine, in response to the similarities including a similarity greater than a similarity threshold, a user corresponding to the $i^{th}$ piece of face image data to be a first-type user, configuring a similar ID for the user corresponding to the $i^{th}$ piece of face image data, add the similar ID of the $i^{th}$ piece of face image data to a first-type database corresponding to the first-type user, and take the first-type database, to which the similar ID of the $i^{th}$ piece of face image data is added, as the similar object database.

In some embodiments, the object identity configuration module 19 is configured to determine, in response to the similarities including no similarity greater than the similarity threshold, the user corresponding to the $i^{th}$ piece of face image data to be a second-type user, configure object ID information for the user corresponding to the $i^{th}$ piece of face image data, add the object ID information of the $i^{th}$ piece of face image data to a second-type database corresponding to the second-type user, and take the second-type database, to which the object ID information of the $i^{th}$ piece of face image data is added, as a normal object database.

In some embodiments, the normal identity return module 20 is configured to acquire, in response to the first recognition result indicating that the target object does not belong to similar objects in the similar object database, object ID information of a user corresponding to the target object, take the object ID information as a normal identity authentication result, and return the normal identity authentication result to the application client. The normal identity authentication result is used for instructing the application client to execute the application service in response to the object ID being the same as a cached ID.

In some embodiments, the recognition service configuration module 21 is configured to configure, in response to the similarity of the $i^{th}$ piece of face image data being greater than the similarity threshold, N types of pattern recognition services for the similar ID of the $i^{th}$ piece of face image data based on the similarity of the $i^{th}$ piece of face image data and registered biometric information entered by the user corresponding to the $i^{th}$ piece of face image data. N is a positive integer. One of the types corresponds to one of the pattern recognition services.

The configuration library determination module 22 is configured to add the N pattern recognition services to a configuration service database associated with the first-type user to obtain a similar service configuration library associated with the similar object database.

In some embodiments, the indication determination module 23 is configured to determine that the target object and the similar object do not belong to the same object in response to the K second recognition results including at least one second recognition result and not indicating that the ID of the target object is the similar ID mapped by the similar object.

The failure result generation module 24 is configured to generate, in response to the target object and the similar object not belonging to the same object, an identity authentication failure result for the target object, and return the identity authentication failure result to the application client to cause the application client to output the identity authentication failure result on an application display interface.

Embodiments of the data stream acquisition module 11, the similar identity acquisition module 12, the pattern recognition service module 13, and the similar identity output module 14 may be obtained with reference to the description of step S101 to step S104 in the foregoing embodiment corresponding to FIG. 3. Details described in those embodiments may apply to other embodiments. In some embodiments or implementations of the streaming media acquisition module 15, the to-be-compared determination module 16, the similarity determination module 17, the similar identity configuration module 18, the object identity configuration module 19, the normal identity return module 20, the recognition service configuration module 21, the configuration library determination module 22, the indication determination module 23, and the failure result generation module 24 may be obtained with reference to the description of step S201 to step S209 in the foregoing embodiment corresponding to FIG. 3. Details described in those embodiments may apply to other embodiments. In addition, beneficial effects achieved by using the same method described in those embodiments may apply to other embodiments.

Figure 12:
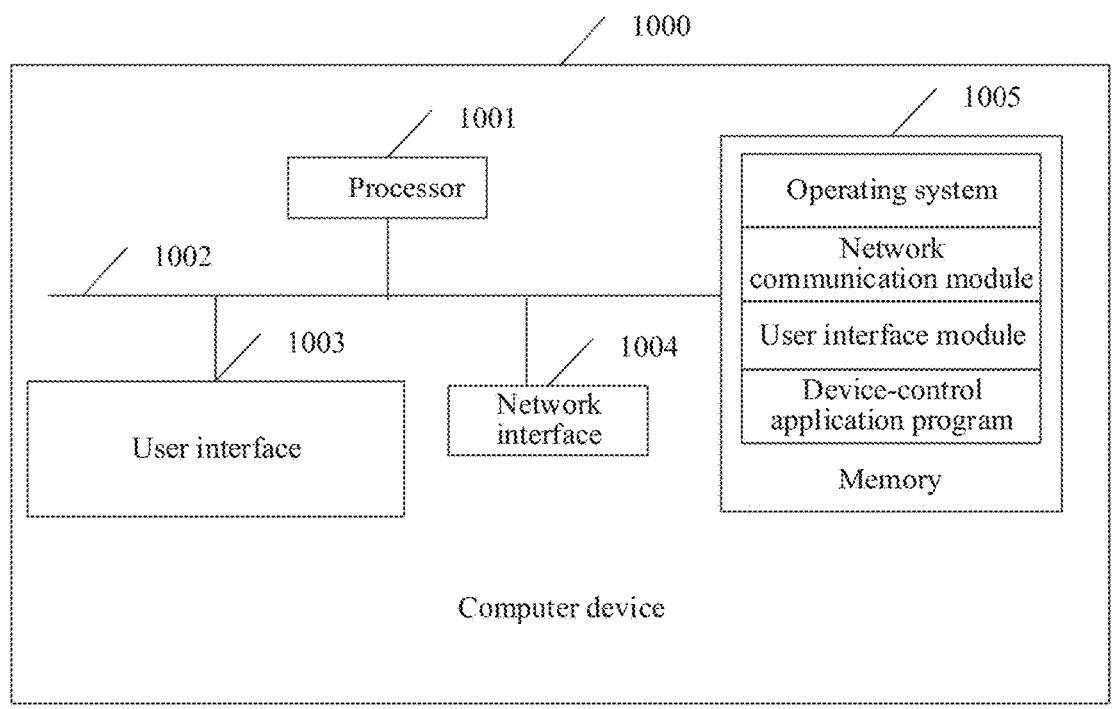
FIG. 12 is a schematic diagram of a computer device according to an embodiment of this application.

In some embodiments, referring to FIG. 12, FIG. 12 is a schematic structural diagram of a computer device according to an embodiment of this application. The computer device 1000 as shown in FIG. 12 may include: at least one processor 1001, for example, a CPU, at least one network interface 1004, a user interface 1003, a memory 1005, and at least one communication bus 1002. The communication bus 1002 is configured to implement connection communication between the components. The network interface 1004 may include a standard wired interface and a standard wireless interface (such as a Wi-Fi interface). The memory 1005 may be a high-speed RAM, or may be a non-volatile memory, for example, at least one magnetic disk memory. The memory 1005 may alternatively be at least one storage device located away from the processor 1001. As shown in FIG. 12, the memory 1005 used as a computer storage medium may include an operating system, a network communication module, a user interface module, and a device-control application program.

In the computer device 1000 shown in FIG. 12, the network interface 1004 is mainly configured to provide a network communication function. The user interface 1003 is mainly configured to provide an input interface for a user. The processor 1001 may be configured to invoke a device control application program stored in the memory 1005 to perform:

acquiring an image data stream including a target object and collected by an application client, and performing first-type identity recognition on the target object in the image data stream based on a similar object database to obtain a first recognition result;

acquiring, in response to the first recognition result indicating that the target object is a similar object in the similar object database, a similar ID associated with the similar object, and acquiring, from a similar service configuration library associated with the similar object database, K pattern recognition services configured for the similar ID; K being a positive integer.

performing second-type identity recognition on the target object in the image data stream through the K pattern recognition services respectively to obtain K second recognition results; and outputting, in response to the K second recognition results indicating that the target object is the similar object, the similar ID to the application client to cause the application client to execute an application service based on the similar ID.

It is to be understood that, the computer device 1000 described in this embodiment of this application may implement the descriptions of the image data processing method in the embodiment corresponding to FIG. 3 or FIG. 7, or the descriptions of the image data processing apparatus 1 in the embodiment corresponding to FIG. 11. Details described in those embodiments may apply to other embodiments. In addition, beneficial effects achieved by using the same method described in those embodiments may apply to other embodiments.

In addition, an embodiment of this application further provides a computer-readable storage medium. The computer-readable storage medium stores a computer program executed by the computer device 1000 mentioned above, and the computer program includes program instructions. When executing the program instructions, the processor can implement the descriptions of the image data processing method in the embodiment corresponding to FIG. 3 or FIG. 7. Therefore, details described in those embodiments may apply to other embodiments. In addition, beneficial effects achieved by using the same method described in those embodiments may apply to other embodiments. For technical details that are not disclosed in the embodiments of the computer-readable storage medium of this application, reference may be made to the method embodiments of this application.

Figure 13:
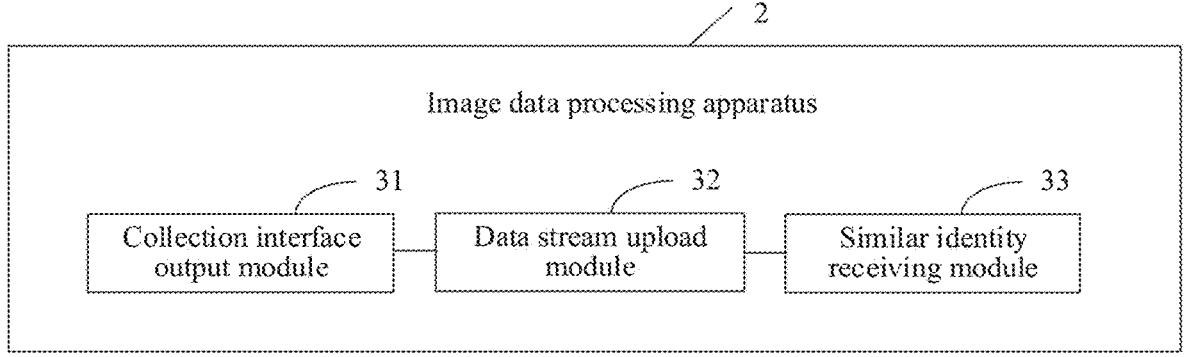
FIG. 13 is a schematic structural diagram of an image data processing apparatus according to an embodiment of this application.

In some embodiments, referring to FIG. 13, FIG. 13 is a schematic structural diagram of an image data processing apparatus according to an embodiment of this application. The above image data processing apparatus 2 may be a computer program (including program code) running in a computer device. For example, the image data processing apparatus 2 may be application software. The apparatus may be configured to perform corresponding steps in the method according to this embodiment of this application. The image data processing apparatus 2 may include a collection interface output module 31, a data stream upload module 32, and a similar identity receiving module 33.

The collection interface output module 31 is configured to output, in response to a trigger operation for an application display interface of an application client, an image collection interface of the application client.

The data stream upload module 32 is configured to collect an image data stream including a target object through the image collection interface, and upload the image data stream to a service server to cause the service server to perform first-type identity recognition on the target object in the image data stream based on a similar object database to obtain a first recognition result. The first recognition result is used for instructing the service server to acquire, from a similar service configuration library associated with the similar object database, K pattern recognition services for performing second-type identity recognition on the target object in response to the target object being a similar object in the similar object database.

The similar identity receiving module 33 is configured to receive a similar ID of the target object returned by the service server based on the K pattern recognition services, and execute an application service of the application client based on the similar ID.

Embodiments of the collection interface output module 31, the data stream upload module 32, and the similar identity receiving module 33 may be obtained with reference to the description of the process of uploading the image data stream to the user terminal and receiving the similar ID in the foregoing embodiment corresponding to FIG. 7 or FIG. 10. Details described in those embodiments may apply to other embodiments. In addition, beneficial effects achieved by using the same method described in those embodiments may apply to other embodiments.

Figure 14:
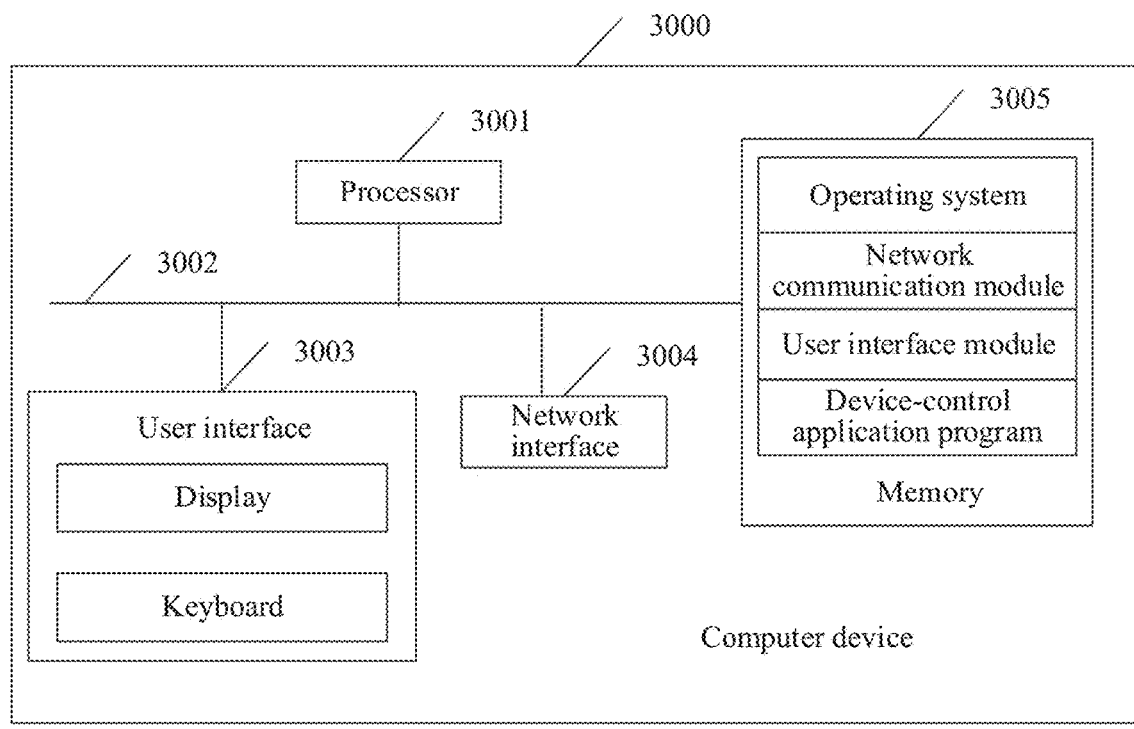
FIG. 14 is a schematic diagram of a computer device according to an embodiment of this application.

In some embodiments, referring to FIG. 14, FIG. 14 is a schematic structural diagram of a computer device according to an embodiment of this application. The computer device 3000 as shown in FIG. 14 may include: at least one processor 3001, for example, a CPU, at least one network interface 3004, a user interface 3003, a memory 3005, and at least one communication bus 3002. The communication bus 3002 is configured to implement connection communication between the components. The network interface 3004 may include a standard wired interface and a standard wireless interface (such as a Wi-Fi interface). The memory 3005 may be a high-speed RAM, or may be a non-volatile memory, for example, at least one magnetic disk memory. The memory 3005 may alternatively be at least one storage device located away from the processor 3001. As shown in FIG. 14, the memory 3005 used as a computer storage medium may include an operating system, a network communication module, a user interface module, and a device-control application program.

In the computer device 3000 shown in FIG. 14, the network interface 3004 is mainly configured to provide a network communication function. The user interface 3003 is mainly configured to provide an input interface for a user. In some embodiments, the user interface 3003 may further include a display and a keyboard. The processor 3001 may be configured to invoke a device control application program stored in the memory 3005 to perform:

outputting, in response to a trigger operation for an application display interface of an application client, an image collection interface of the application client;

collecting an image data stream including a target object through the image collection interface, and uploading the image data stream to a service server to cause the service server to perform first-type identity recognition on the target object in the image data stream based on a similar object database to obtain a first recognition result; the first recognition result being used for instructing the service server to acquire, from a similar service configuration library associated with the similar object database, K pattern recognition services for performing second-type identity recognition on the target object in response to the target object being a similar object in the similar object database; and receiving a similar ID of the target object returned by the service server based on the K pattern recognition services, and executing an application service of the application client based on the similar ID.

It is to be understood that, the computer device 3000 described in this embodiment of this application may implement the descriptions of the image data processing method in the embodiment corresponding to FIG. 7 or FIG. 10, or the descriptions of the image data processing apparatus 2 in the embodiment corresponding to FIG. 13. Details described in those embodiments may apply to other embodiments. In addition, beneficial effects achieved by using the same method described in those embodiments may apply to other embodiments.

In addition, an embodiment of this application further provides a computer-readable storage medium. The computer-readable storage medium stores a computer program executed by the computer device 3000 mentioned above, and the computer program includes program instructions. When executing the program instructions, the processor can implement the descriptions of the image data processing method in the embodiment corresponding to FIG. 7 or FIG. 10. Therefore, details described in those embodiments may apply to other embodiments. In addition, beneficial effects achieved by using the same method described in those embodiments may apply to other embodiments. For technical details that are not disclosed in the embodiments of the computer-readable storage medium of this application, reference may be made to the method embodiments of this application.

It may be understood that, an embodiment of this application further provides a computer program product or a computer program. The computer program product or the computer program includes computer instructions, and the computer instructions are stored in a computer-readable storage medium. A processor of a computer device reads the computer instructions from the computer-readable storage medium, and executes the computer instructions, to cause the computer device to perform the descriptions of the image data processing method in the embodiment corresponding to FIG. 3, FIG. 7, or FIG. 10. Therefore, details described in those embodiments may apply to other embodiments. In addition, beneficial effects achieved by using the same method described in those embodiments may apply to other embodiments.

Figure 15:
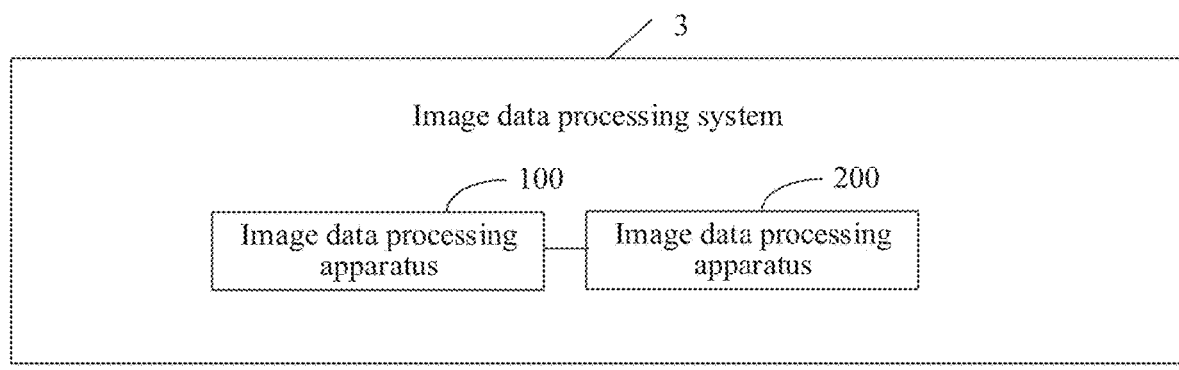
FIG. 15 is a schematic structural diagram of an image data processing system according to an embodiment of this application.

In some embodiments, referring to FIG. 15, FIG. 15 is a schematic structural diagram of an image data processing system according to an embodiment of this application. The image data processing system 3 may include an image data processing apparatus 100 and an image data processing apparatus 200. The image data processing apparatus 100 may be the image data processing apparatus 1 in the foregoing embodiment corresponding to FIG. 11. It may be understood that the image data processing apparatus 200 may be integrated into the service server in the foregoing embodiment corresponding to FIG. 2. Therefore, details described in those embodiments may apply to other embodiments. The image data processing apparatus 200 may be the image data processing apparatus 2 in the foregoing embodiment corresponding to FIG. 13. It may be understood that the image data processing apparatus 200 may be integrated into the target user terminal in the foregoing corresponding embodiment. Therefore, details described in those embodiments may apply to other embodiments. For technical details that are not disclosed in the embodiment of the computer storage medium of this application, refer to the descriptions of the method embodiments of this application.

A person of ordinary skill in the art may understand that all or some of the processes of the methods in the foregoing embodiments may be implemented by a computer program instructing relevant hardware. The program may be stored in a computer-readable storage medium. When the program runs, the processes of the foregoing methods in the embodiments may be performed. The foregoing storage medium may be: a magnetic disk, an optical disc, a read-only memory (ROM), or a random access memory (RAM).

The foregoing disclosure is merely exemplary embodiments of this application, and certainly is not intended to limit the protection scope of this application. Therefore, equivalent variations made according to the claims of this application shall still fall within the scope of this application.

What is claimed is:

1. An image data processing method, performed by a computer device, the method comprising:
acquiring an image data stream comprising a target object that is collected by an application client;
performing a first-type identity recognition on the target object in the image data stream based on a similar object database to obtain a first recognition result;
acquiring, when the first recognition result indicates that the target object is a similar object in the similar object database, a similar identity document (ID) associated with the similar object;
acquiring, from a similar service configuration library associated with the similar object database, K pattern recognition services configured for the similar ID, wherein K is a positive integer;
performing a second-type identity recognition on the same target object in the image data stream through the K pattern recognition services to obtain K second recognition results;
outputting, when the K second recognition results indicate that the target object is the similar object, the similar ID to the application client; and
causing the application client to execute an application service based on the similar ID.

2. The method according to claim 1, wherein the acquiring the image data stream with the target object further comprises:
acquiring a service data packet uploaded by the application client;
parsing the service data packet through a streaming media service associated with the application client to obtain application signature information corresponding to the application client, wherein the application signature information is obtained after the application client signs the collected image data stream through an application private key;
performing signature verification on the application signature information through an application public key corresponding to the application private key;
determining, in response to the signature verification being successful, the application client transmitting the image data stream to be a legitimate client, and determining that the image data stream belongs to a legitimate data stream associated with an associated application service of the application client;
acquiring a target image frame comprising a target object from the legitimate data stream; and
performing first-type identity recognition on the target object in the target image frame based on the similar object database to obtain the first recognition result.

3. The method according to claim 2, wherein the target object comprises a face of a target user, wherein the acquiring the target image frame comprising a target object from the legitimate data stream, and the performing the first-type identity recognition on the target object further comprises:
serializing the legitimate data stream to obtain an initial image sequence corresponding to the legitimate data stream by using each image frame of the initial image sequence as a candidate image frame;
determining target object regions comprising the target object in the candidate image frames;
capturing the corresponding target object regions comprising the target object from the candidate image frames;
performing quality assessment on each of the target object regions comprising the target object to obtain a quality assessment result;
filtering out blurred image frames in the candidate image frames according to the quality assessment results;
determining, in the candidate image frames with the blurred image frames filtered out, a candidate image frame with the highest resolution to be the target image frame comprising the target object; and performing face recognition on the target object in the target image frame based on the similar object database to obtain the first recognition result.

4. The method according to claim 3, wherein the method further comprises:
acquiring streaming media information of M users, wherein one piece of the streaming media information comprises face image data of one of the users, wherein M is a positive integer;
acquiring an $i^{th}$ piece of face image data from M pieces of face image data by using the face image data in the M pieces of face image data except the $i^{th}$ piece of face image data as to-be-compared image data, wherein i is a positive integer less than or equal to M;
comparing the $i^{th}$ piece of face image data with the to-be-compared image data;
determining similarities between a face in the $i^{th}$ piece of face image data and faces in the to-be-compared image data according to comparison results;
determining, in response to the similarities comprising a similarity greater than a similarity threshold, a user corresponding to the $i^{th}$ piece of face image data to be a first-type user; and
configuring a similar ID for the user corresponding to the $i^{th}$ piece of face image data by adding the similar ID of the $i^{th}$ piece of face image data to a first-type database corresponding to the first-type user, wherein the first-type database, to which the similar ID of the $i^{th}$ piece of face image data is added, as the similar object database.

5. The method according to claim 4, wherein the method further comprises:
determining, in response to the similarities comprising no similarity greater than the similarity threshold, the user corresponding to the $i^{th}$ piece of face image data to be a second-type user; and
configuring an object ID for the user corresponding to the $i^{th}$ piece of face image data by adding the object ID of the $i^{th}$ piece of face image data to a second-type database corresponding to the second-type user, and using the second-type database, to which the object ID of the $i^{th}$ piece of face image data is added, as a normal object database.

6. The method according to claim 5, wherein the method further comprises:
acquiring, in response to the first recognition result indicating that the target object does not belong to similar objects in the similar object database, an object ID of a user corresponding to the target object from the normal object database, using the object ID as a normal identity authentication result;
returning the normal identity authentication result to the application client; and
instructing, using the normal identity authentication result, the application client to execute the application service in response to the object ID being the same as a cached ID.

7. The method according to claim 4, wherein the method further comprises:
configuring, in response to the similarity of the $i^{th}$ piece of face image data being greater than the similarity threshold, N types of pattern recognition services for the similar ID of the $i^{th}$ piece of face image data based on the similarity of the $i^{th}$ piece of face image data and registered biometric information entered by the user corresponding to the $i^{th}$ piece of face image data, wherein N is a positive integer and one of the types corresponding to one of the pattern recognition services; and
adding the N pattern recognition services to a configuration service database associated with the first-type user to obtain a similar service configuration library associated with the similar object database.

8. The method according to claim 1, wherein the performing the second-type identity recognition further comprises:
outputting the K pattern recognition services to a service scheduling component;
configuring the image data stream for the K pattern recognition services through the service scheduling component;
acquiring a $j^{th}$ pattern recognition service from the K pattern recognition services, wherein i is a positive integer less than or equal to K; and
performing second-type identity recognition on the target object in the image data stream through the $j^{th}$ pattern recognition service until the second-type identity recognition is performed on the target object in the image data stream through each pattern recognition service to obtain the K second recognition results.

9. The method according to claim 1, wherein the outputting further comprises:
determining that the target object and the similar object belong to a same object in response to the K second recognition results indicating that an ID of the target object is a similar ID mapped by the similar object, wherein the similar ID is a similar identity authentication result;
returning the similar identity authentication result to the application client; and
executing, using the similar identity authentication result for instructing the application client, the application service in response to the object ID being the same as a cached ID.

10. The method according to claim 9, wherein the method further comprises:
determining that the target object and the similar object do not belong to the same object in response to the K second recognition results including at least one second recognition result and not indicating that the ID of the target object is the similar ID mapped by the similar object; and
generating, in response to the target object and the similar object not belonging to the same object, an identity authentication failure result for the target object; and
returning the identity authentication failure result to the application client to cause the application client to output the identity authentication failure result on an application display interface.

11. An image data processing method comprising:
outputting, in response to a trigger operation for an application display interface of an application client, an image collection interface of the application client;
collecting an image data stream comprising a target object through the image collection interface;
uploading the image data stream to a service server to cause the service server to perform first-type identity recognition on the target object in the image data stream based on a similar object database to obtain a first recognition result which is used for instructing the service server to acquire, from a similar service configuration library associated with the similar object database, K pattern recognition services for performing second-type identity recognition on the same target object in response to the target object being a similar object in the similar object database; and receiving a similar identity document (ID) of the target object returned by the service server based on the K pattern recognition services; and executing an application service of the application client based on the similar ID.

12. The image data processing method of claim 11, wherein the collecting the image data stream further comprises:

acquiring a service data packet uploaded by the application client;

parsing the service data packet through a streaming media service associated with the application client to obtain application signature information corresponding to the application client, wherein the application signature information is obtained after the application client signs the collected image data stream through an application private key;

performing signature verification on the application signature information through an application public key corresponding to the application private key;

determining, in response to the signature verification being successful, the application client transmitting the image data stream to be a legitimate client, and determining that the image data stream belongs to a legitimate data stream associated with an associated application service of the application client;

acquiring a target image frame comprising a target object from the legitimate data stream; and performing first-type identity recognition on the target object in the target image frame based on the similar object database to obtain the first recognition result.

13. The image data processing method of claim 12, wherein the target object comprises a face of a target user, wherein the acquiring the target image frame comprising a target object from the legitimate data stream, and the performing the first-type identity recognition on the target object further comprises:

serializing the legitimate data stream to obtain an initial image sequence corresponding to the legitimate data stream by using each image frame of the initial image sequence as a candidate image frame;

determining target object regions comprising the target object in the candidate image frames;

capturing the corresponding target object regions comprising the target object from the candidate image frames;

performing quality assessment on each of the target object regions comprising the target object to obtain a quality assessment result;

filtering out blurred image frames in the candidate image frames according to the quality assessment results;

determining, in the candidate image frames with the blurred image frames filtered out, a candidate image frame with the highest resolution to be the target image frame comprising the target object; and performing face recognition on the target object in the target image frame based on the similar object database to obtain the first recognition result.

14. The image data processing method of claim 13, wherein the method further comprises:

acquiring streaming media information of M users, wherein one piece of the streaming media information comprises face image data of one of the users, wherein M is a positive integer;

acquiring an $i^{th}$ piece of face image data from M pieces of face image data by using the face image data in the M pieces of face image data except the $i^{th}$ piece of face image data as to-be-compared image data, wherein i is a positive integer less than or equal to M;

comparing the $i^{th}$ piece of face image data with the to-be-compared image data;

determining similarities between a face in the $i^{th}$ piece of face image data and faces in the to-be-compared image data according to comparison results;

determining, in response to the similarities comprising a similarity greater than a similarity threshold, a user corresponding to the $i^{th}$ piece of face image data to be a first-type user; and configuring a similar ID for the user corresponding to the $i^{th}$ piece of face image data by adding the similar ID of the $i^{th}$ piece of face image data to a first-type database corresponding to the first-type user, wherein the first-type database, to which the similar ID of the $i^{th}$ piece of face image data is added, as the similar object database.

15. The image data processing method of claim 14, wherein the method further comprises:

determining, in response to the similarities comprising no similarity greater than the similarity threshold, the user corresponding to the $i^{th}$ piece of face image data to be a second-type user; and configuring an object ID for the user corresponding to the $i^{th}$ piece of face image data by adding the object ID of the $i^{th}$ piece of face image data to a second-type database corresponding to the second-type user, and using the second-type database, to which the object ID of the $i^{th}$ piece of face image data is added, as a normal object database.

16. The image data processing method of claim 15, wherein the method further comprises:

acquiring, in response to the first recognition result indicating that the target object does not belong to similar objects in the similar object database, an object ID of a user corresponding to the target object from the normal object database, using the object ID as a normal identity authentication result;

returning the normal identity authentication result to the application client; and instructing, using the normal identity authentication result, the application client to execute the application service in response to the object ID being the same as a cached ID.

17. The image data processing method of claim 11, wherein the performing the second-type identity recognition further comprises:

outputting the K pattern recognition services to a service scheduling component;

configuring the image data stream for the K pattern recognition services through the service scheduling component;

acquiring a $j^{th}$ pattern recognition service from the K pattern recognition services, wherein i is a positive integer less than or equal to K; and performing second-type identity recognition on the target object in the image data stream through the $j^{th}$ pattern recognition service until the second-type identity recognition is performed on the target object in the image data stream through each pattern recognition service to obtain the K second recognition results.

18. The image data processing method of claim 11, wherein the receiving the similar ID of the target object further comprises:

determining that the target object and the similar object belong to a same object in response to the K recognition results indicating that an ID of the target object is a similar ID mapped by the similar object, wherein the similar ID is a similar identity authentication result;

returning the similar identity authentication result to the application client; and executing, using the similar identity authentication result for instructing the application client, the application service in response to the object ID being the same as a cached ID.

19. A non-transitory computer readable medium, storing at least one instruction, at least one program, a code set, or an instruction set that is loaded and executed by a processor to implement:

acquiring an image data stream with a target object that is collected by an application client;

obtaining a first recognition result using on a first-type identity recognition performed on the target object in the image data stream with a similar object database;

acquiring, when the first recognition result indicates that the target object is a similar object in the similar object database, a similar identity document (ID) associated with the similar object;

acquiring, from a similar service configuration library associated with the similar object database, K pattern recognition services configured for the similar ID, wherein K is a positive integer;

obtaining K second recognition results using a second-type identity recognition on the same target object in the image data stream through the K pattern recognition services;

outputting, when the K second recognition results indicate that the target object is the similar object, the similar ID to the application client; and causing the application client to execute an application service based on the similar ID.

20. The computer-readable storage medium of claim 19, wherein for the outputting the processor is configured to implement:

determining that the target object and the similar object belong to a same object in response to the K second recognition results indicating that an ID of the target object is a similar ID mapped by the similar object, wherein the similar ID is a similar identity authentication result; and returning the similar identity authentication result to the application client;

executing, using the similar identity authentication result for instructing the application client, the application service in response to the object ID being the same as a cached ID.

* * * * *